(12) United States Patent
Ye et al.

(10) Patent No.: US 10,535,855 B2
(45) Date of Patent: Jan. 14, 2020

(54) ELECTRICAL TOOLS, NICKEL-ZINC BATTERY SYSTEM AND MANUFACTURING METHOD THEREFOR

(71) Applicant: Hangzhou Neucell Energy Co., Ltd., Hangzhou, Zhejiang (CN)

(72) Inventors: Jingrong Ye, Hongzhou (CN); Fuyuan Ma, Hangzhou (CN); Weijie Pan, Hangzhou (CN)

(73) Assignee: Hangzhou Neucell Energy Co., Ltd., Hangzhou, Zhejiang (CN)

( * ) Notice: Subject to any disclaimer, the term of this patent is extended or adjusted under 35 U.S.C. 154(b) by 186 days.

(21) Appl. No.: 15/548,413

(22) PCT Filed: Feb. 4, 2016

(86) PCT No.: PCT/CN2016/073563
§ 371 (c)(1),
(2) Date: Aug. 3, 2017

(87) PCT Pub. No.: WO2016/124151
PCT Pub. Date: Aug. 11, 2016

(65) Prior Publication Data
US 2018/0040871 A1 Feb. 8, 2018

(30) Foreign Application Priority Data
Feb. 5, 2015 (CN) .......................... 2015 1 0060666

(51) Int. Cl.
*H01M 2/20* (2006.01)
*H01M 2/10* (2006.01)
*H01M 10/42* (2006.01)
*H01M 10/30* (2006.01)
*B25F 5/02* (2006.01)

(52) U.S. Cl.
CPC ............... *H01M 2/204* (2013.01); *B25F 5/02* (2013.01); *H01M 2/105* (2013.01); *H01M 10/30* (2013.01); *H01M 10/425* (2013.01); *H01M 2220/30* (2013.01)

(58) Field of Classification Search
CPC ...... H01M 2/204; H01M 2/105; H01M 10/30; H01M 10/425
See application file for complete search history.

(56) References Cited

U.S. PATENT DOCUMENTS

| | | | | |
|---|---|---|---|---|
| 4,217,400 A | * | 8/1980 | Leffingwell | H01M 2/105 429/61 |
| 2006/0082345 A1 | * | 4/2006 | Daniel-Ivad | H01M 10/4207 320/134 |
| 2015/0072217 A1 | * | 3/2015 | Kim | H01M 2/206 429/156 |
| 2016/0111762 A1 | * | 4/2016 | Kawakami | H01M 10/625 429/83 |
| 2016/0329543 A1 | * | 11/2016 | Zhang | H01R 13/533 |

* cited by examiner

*Primary Examiner* — Jonathan G Jelsma
(74) *Attorney, Agent, or Firm* — Raymond Y. Chan; David and Raymond Patent Firm

(57) ABSTRACT

The present invention further provides a nickel-zinc battery system used for rechargeable electrical tools. The present invention further provides a method for manufacturing a battery set of the nickel-zinc battery system. A diode of the nickel-zinc battery set manufactured by the method can be hidden in a receiving slot.

20 Claims, 19 Drawing Sheets

M) cutting sheet metal to obtain the first connecting unit 121 and the second connecting unit 122;

N1) respectively electrically connecting the positive terminal 152 and the negative terminal 151 of a second diode 15 to a third connecting unit 123 and the first negative connecting portion 1213 of an end first connecting unit 121;

A) respectively electrically connecting the positive terminal 132 and the negative terminal 131 of a first diode 13 to the first positive connecting portion 1214 of a first connecting unit 121 and the second negative connecting portion 1223 of a second connecting unit 122 that is subsequent to the first connecting unit 121;

B) respectively electrically connecting the positive terminal 132 and the negative terminal 131 of another first diode 13 to the second positive connecting portion 1224 of the second connecting unit 122 and the first negative connecting portion 1213 of a first connecting unit 121 that is subsequent to the second connecting unit 122;

C) repeating said step A) and B) sequentially for N time, wherein N is a integer not less than zero; and

N2) respectively electrically connecting the positive terminal 152 and the negative terminal 151 of another second diode 15 to the first positive connecting portion 1214" of another end first connecting unit 122" and another third connecting unit 123, so as to make the connecting device.

FIG. 6B

M) cutting sheet metal to obtain the first connecting unit 121 and the second connecting unit 122;

N1) respectively electrically connecting the positive terminal 152 and the negative terminal 151 of a second diode 15 to a third connecting unit 123B and the first negative connecting portion 1213' of an end first connecting unit 121';

A) respectively electrically connecting the positive terminal 132 and the negative terminal 131 of a first diode 13 to the first positive connecting portion 1214 of a first connecting unit 121 and the second negative connecting portion 1223 of a second connecting unit 122 that is subsequent to the first connecting unit 121;

B) respectively electrically connecting the positive terminal 132 and the negative terminal 131 of another first diode 13 to the second positive connecting portion 1224 of the second connecting unit 122 and the first negative connecting portion 1213 of a first connecting unit 121 that is subsequent to the second connecting unit 122;

C) sequentially repeating said step A) and B) for N time, wherein N is a integer not less than zero;

N2) respectively electrically connecting the positive terminal 152 and the negative terminal 151 of another second diode 15 to the first positive connecting portion 1214" of another end first connecting unit 121" and another third connecting unit 123;

N3) electrically connecting the anode and cathode of a second nickel-zinc battery cell 14 to an end first connecting unit 121' and a third connecting unit 123 respectively;

D) electrically arranging the first nickel-zinc battery cells 11 at the first position 1201 and the second position 1202 respectively; and N4) electrically connecting the anode and cathode of another second nickel-zinc battery cell 14 to another third connecting unit 123 and another end first connecting unit 121" respectively.

FIG. 11B

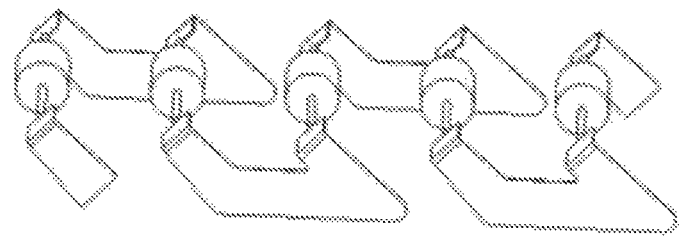
5 diode connection string mode  FIG. 20
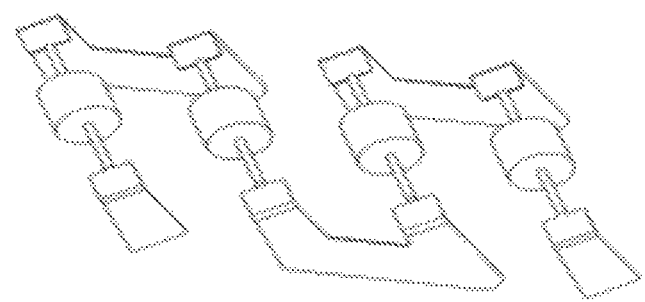
4 diode connection string mode  FIG. 19
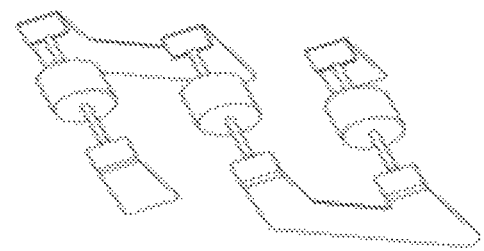
3 diode connection string mode  FIG. 18
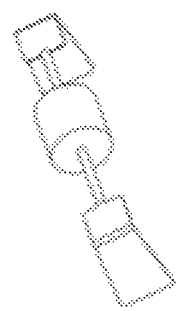
1 diode connection string mode  FIG. 17

18V Battery Pack

ELECTRICAL TOOLS, NICKEL-ZINC BATTERY SYSTEM AND MANUFACTURING METHOD THEREFOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to electrical tools, and more particularly to rechargeable electrical tools that utilize nickel-zinc battery (system). The present invention further relates to nickel-zinc battery system (battery pack) adapted for electrical tools and manufacturing method therefor.

Description of Related Arts

Electrical tools, especially rechargeable electrical tools, such as electric drill, electric hammer, electric planer, concrete vibrator, electric wrench, electric screwdriver, electric saw, and electric impact drill, usually require rechargeable battery to serve as power supply. Normally, a rechargeable electrical tool has a rechargeable battery (system), an electric motor, a transmission mechanism, and a working portion, such as the drill bit of an electric drill, the hammer of an electric hammer, the planer blade of an electric planer, the vibration output unit of a vibrator, the spanner of an electric wrench, etc. Generally, the battery system of a rechargeable electrical tool provides electric power, such that the electric motor can be started to provide driving force. Then the transmission mechanism transmits the driving force output by the electric motor to the working portion of the electrical tool and drives the working portion so as to implement the corresponding function of the electrical tool.

Nowadays, rechargeable batteries for rechargeable electrical tools are usually nickel-cadmium battery or lithium battery. Nickel-cadmium battery or nickel-cadmium battery system (or nickel-cadmium battery pack) has advantages like repeatable charging and discharging, economical and practical, low internal resistance, rapid charge rate, and ability of providing heavy current for the load. Unfortunately, nickel-cadmium battery has several drawbacks as well. First, both the producing and utilizing of nickel-cadmium battery pollute the environment. Next, the memory effect of nickel-cadmium battery makes its battery capacity decrease rapidly and reduces its duration significantly. Lithium battery or lithium battery system (or lithium battery pack) has higher energy density and high power endurance. However, either external short circuit, internal short circuit, or overcharge of the lithium battery or lithium battery system (or lithium battery pack) can cause fire or explosion of the battery. Hence, for operational safety, a lithium battery or lithium battery pack has to have a protective circuit (PCB) to avoid high temperature and overcharge/over-discharge of the lithium battery or lithium battery system (or lithium battery pack). Also, a lithium battery or lithium battery system (or lithium battery pack) needs low-voltage protection to prevent battery damage caused by its self-discharge. Moreover, the requirements of the operating environment of lithium battery or lithium battery system (or lithium battery pack) are strict. Both high temperature and low temperature environments can lead the battery fail. Nevertheless, electrical tools, especially rechargeable electrical tools, are usually required to be utilized under severe environmental conditions. Lastly, the protective circuit (PCB) of lithium battery or lithium battery system (or lithium battery pack) may not completely avert the security risks of the lithium battery or lithium battery system.

SUMMARY OF THE PRESENT INVENTION

A main object of the present invention is to provide a nickel-zinc battery system (or nickel-zinc battery pack) for rechargeable electrical tool, wherein the nickel-zinc battery system has high-power discharge ability so as to be adapted for electrical tool.

Another object of the present invention is to provide a nickel-zinc battery system for rechargeable electrical tool, wherein the process of manufacture of the nickel-zinc battery system involves less pollutants and the used nickel-zinc battery system is not likely to release severe pollutants to the environment. In other words, making and using the nickel-zinc battery system turn to be more environmental friendly.

Another object of the present invention is to provide a nickel-zinc battery system for rechargeable electrical tool, wherein the nickel-zinc battery cell of the nickel-zinc battery comprises a plurality of nickel-zinc battery cells, wherein these nickel-zinc battery cells are series connected through a connecting device so as to provide adequate voltage for the rechargeable electrical tool. Alternatively, the nickel-zinc battery cells of the nickel-zinc battery system can be parallel connected.

Another object of the present invention is to provide a nickel-zinc battery system for rechargeable electrical tool, wherein the nickel-zinc battery cell of the nickel-zinc battery system is recyclable and reusable.

Another object of the present invention is to provide a nickel-zinc battery system adapted for rechargeable electrical tool, wherein the nickel-zinc battery system does not combust spontaneously due to the high temperature thereof or fail to be recharged due to low voltage. In other words, the nickel-zinc battery system does not need protective circuit for the battery cell thereof to keep its power supply stability and security from affection of high temperature, overcurrent, or overvoltage.

Another object of the present invention is to provide a nickel-zinc battery system for rechargeable electrical tool, wherein the nickel-zinc battery system has a zero-voltage charge ability. Hence, the rechargeable electrical tool that utilizes the nickel-zinc battery system can still function normally after long time shelving.

Another object of the present invention is to provide a nickel-zinc battery system adapted for rechargeable electrical tool, wherein the nickel-zinc battery system does not have memory effect, such that the electric capacity thereof is more efficient. In other words, after the nickel-zinc battery system was used for a long time, it does not loss electric capacity due to memory effect.

Another object of the present invention is to provide a nickel-zinc battery system adapted for rechargeable electrical tool, wherein the nickel-zinc battery system has a smaller size and lower weight, so that the rechargeable electrical tool that employs the nickel-zinc battery system can have smaller size and lower weight and become more user friendly for the user. Also, the size and weight of a rechargeable electrical tool are reduced, which helps to lower the production costs of the rechargeable electrical tool for the manufacturer.

Another object of the present invention is to provide a nickel-zinc battery system adapted for rechargeable electrical tool, wherein all materials of the nickel-zinc battery cell of the nickel-zinc battery system are non-flammable materials, so as to enhance the safety and stability of the electrical tool that utilizes the nickel-zinc battery system.

Another object of the present invention is to provide a battery set of a nickel-zinc battery system, wherein the battery set comprises a plurality of nickel-zinc battery cells and a connecting device to connect the nickel-zinc battery cells in series.

Another object of the present invention is to provide a connecting device adapted for a nickel-zinc battery system, wherein the connecting device makes a plurality of nickel-zinc battery cells easily to be assembled in series, so as to form the battery set of the nickel-zinc battery system according to the present invention.

Another object of the present invention is to provide a manufacturing method for nickel-zinc battery system, wherein the manufacturing method for nickel-zinc battery system can assemble a plurality of nickel-zinc battery cells parallelly, so as to make the nickel-zinc battery system and provide suitable voltage for electrical tool. Alternatively, the manufacturing method for nickel-zinc battery system can assemble a plurality of nickel-zinc battery cells parallelly, so as to make the nickel-zinc battery system and provide suitable electric current for electrical tool.

Another object of the present invention is to provide a manufacturing method for nickel-zinc battery system, wherein the technology of the manufacturing method for nickel-zinc battery system is simple, so as to manufacture the nickel-zinc battery system adapted for electrical tool according to the present invention in a fast, mass, and low cost manner.

Another object of the present invention is to provide an electrical tool, especially a rechargeable electrical tool, which employs nickel-zinc battery system as the power source thereof, such that the electrical tool has smaller size and lighter weight.

Another object of the present invention is to provide an electrical tool, especially a rechargeable electrical tool, which employs nickel-zinc battery system as the power source thereof, wherein the manufacturing and using of the nickel-zinc battery cell of the nickel-zinc battery system are more environmental friendly.

Another object of the present invention is to provide an electrical tool, especially a rechargeable electrical tool, which employs nickel-zinc battery system as the power source thereof, wherein nickel-zinc battery cell of the nickel-zinc battery system is easy to recycle and reuse.

Another object of the present invention is to provide an electrical tool, especially a rechargeable electrical tool, which employs nickel-zinc battery system as the power source thereof, wherein the nickel-zinc battery system does not combust spontaneously due to the high temperature thereof or fail to be recharged due to low voltage. In other words, the nickel-zinc battery system does not need protective circuit for the battery cell thereof to keep its power supply stability and security from affection of high temperature, overcurrent, or overvoltage.

Another object of the present invention is to provide an electrical tool, especially a rechargeable electrical tool, which employs nickel-zinc battery system as the power source thereof, wherein the nickel-zinc battery system has a zero-voltage charge ability. Hence, the rechargeable electrical tool that utilizes the nickel-zinc battery system can still function normally after a long time shelving.

Another object of the present invention is to provide an electrical tool, especially a rechargeable electrical tool, which employs nickel-zinc battery system as the power source thereof, wherein the nickel-zinc battery system does not have memory effect, such that the electric capacity thereof is more efficient. In other words, after the nickel-zinc battery system was used for a long time, it does not loss electric capacity due to memory effect.

Another object of the present invention is to provide an electrical tool, especially a rechargeable electrical tool, which employs nickel-zinc battery system as the power source thereof, wherein the nickel-zinc battery system has a smaller size and lower weight, such that rechargeable electrical tool that employs the nickel-zinc battery system can have smaller size and lower weight and become more user friendly for the user. Also, the size and weight of a rechargeable electrical tool are reduced, which helps to lower the production costs of the rechargeable electrical tool for the manufacturer.

Another object of the present invention is to provide an electrical tool, especially a rechargeable electrical tool, which employs nickel-zinc battery system as the power source thereof, wherein all materials of the nickel-zinc battery cell of the nickel-zinc battery system are non-flammable materials, so as to enhance the safety and stability of the electrical tool that utilizes the nickel-zinc battery system.

Another object of the present invention is to provide an electrical tool based on nickel-zinc battery and the battery pack thereof that is environment-friendly battery valuable for recycling to be substitutable for the nickel-cadmium battery that may pollute the environment.

Another object of the present invention is to provide an electrical tool based on nickel-zinc battery and the battery pack thereof that does not have memory effect, so as to greatly enhance the efficiency of the capacity of the rechargeable battery, while a nickel-cadmium battery has memory effect.

Another object of the present invention is to provide an electrical tool based on nickel-zinc battery and the battery pack thereof having high multiplying power discharge ability that is very helpful for the application of electrical tools with big torsion, comprising electric circular saw, electric impact wrench, electric drill with flat drill, and etc.

Another object of the present invention is to provide an electrical tool based on nickel-zinc battery and the battery pack thereof that is reliably secure because it employs 100% of non-flammable material. This is crucial for most household users in the electrical tool market. Nonetheless, its features are what the lithium battery electrical tools do not have. Even if the lithium battery electrical tools have employed various types of PCB design to avoid the high temperature, over-current, and over-voltage of the battery, so as to keep its security, but it still cannot fundamentally prevent the security issues caused by battery quality. In other words, electrical tool with lithium battery has potential safety hazard.

Another object of the present invention is to provide an electrical tool based on nickel-zinc battery and the battery pack thereof that has zero-volt charging ability, which is a critical advantage for the long time shelving of electrical tool because it greatly increases the shelf life for sales and the shelving time for the user of the electrical tool that the electrical tool does not require periodical recharging.

Another object of the present invention is to provide an electrical tool based on nickel-zinc battery and the battery pack that provides welding technology to assemble the nickel-zinc battery pack for high voltage electrical tools. Therefore, it can ensure mass production and maintain low cost as well as meet the requirements of welding uniformity and quality of the assembling of the battery.

Other objects and features of the present invention can be fully reflected through the following detail description and be achieved through the assembling of the methods and devices specified in the appended claims.

In order to achieve the above objects, the present invention provides a nickel-zinc battery system, comprising:

at least a battery set; and a battery case accommodating the battery set therewithin, wherein each battery set has a positive pole and a negative pole, wherein the battery case comprises a casing, a anode interface arranged on the casing, and a cathode interface arranged on the casing, wherein the anode interface of the battery case and the positive pole of the battery set are electrically connected, wherein the cathode interface of the battery case and the negative pole of the battery set are electrically connected, wherein the battery set comprises:

a plurality of first nickel-zinc battery cell;

a connecting device connecting the first cell nickel-zinc batteries of the battery set in series; and a plurality of first diodes, wherein the first diodes of the battery set respectively correspond to the first nickel-zinc battery cells of the battery set, wherein the connecting device comprises at least a first connecting unit and at least a second connecting unit, wherein the first connecting unit and the second connecting unit are both made of conductive material and the first connecting unit and the second connecting unit of the connecting device are alternately arranged, so as to allow each second connecting unit to form a first position with the previous adjacent the first connecting unit, a first connecting position subsequent to the first position, a second position with the subsequent adjacent the first connecting unit, and a second connecting position next to the second position, wherein the nickel-zinc battery cells of the battery set are respectively arranged at the first position and the second position, wherein the first nickel-zinc battery cells of the battery set are arranged to be connected in series through the first connecting unit and the second connecting unit, wherein the first diodes of the battery set are respectively arranged at the first connecting position and the second connecting position, wherein a negative terminal of each first diode is electrically connected with the anode of corresponding the first nickel-zinc battery cell through the first connecting unit and the second connecting unit, wherein a positive terminal of the first diode is electrically connected with the cathode of the first nickel-zinc battery cell through the first connecting unit and the second connecting unit, wherein the first nickel-zinc battery cell arranged at the first position forms a first receiving slot, wherein the first nickel-zinc battery cell arranged at the second position forms a second receiving slot, wherein the first connecting position is formed within the first receiving slot, wherein the second connecting position is formed within the second receiving slot.

The present invention further provides a rechargeable electrical tool, comprising:

a nickel-zinc battery system for providing electric power;

an electric motor electrically connected with the nickel-zinc battery system;

a transmission mechanism; and a working portion, wherein the transmission mechanism is arranged between the electric motor and the working portion, wherein the transmission mechanism is arranged for transmitting the power generated by the electric motor to the working portion, so as for driving the working portion to implement the function of the electrical tool, wherein the nickel-zinc battery system comprises at least a battery set, wherein each battery set has a positive pole and a negative pole, wherein the battery set comprises:

a plurality of first nickel-zinc battery cell;

a connecting device connecting the first cell nickel-zinc batteries of the battery set in series; and a plurality of first diodes, wherein the first diodes of the battery set respectively correspond to the first nickel-zinc battery cells of the battery set, wherein the connecting device comprises at least a first connecting unit and at least a second connecting unit, wherein the first connecting unit and the second connecting unit are both made of conductive material and the first connecting unit and the second connecting unit of the connecting device are alternately arranged, so as to allow each second connecting unit to form a first position with the previous adjacent the first connecting unit, a first connecting position subsequent to the first position, a second position with the subsequent adjacent the first connecting unit, and a second connecting position next to the second position, wherein the nickel-zinc battery cells of the battery set are respectively arranged at the first position and the second position, wherein the first nickel-zinc battery cells of the battery set are arranged to be connected in series through the first connecting unit and the second connecting unit, wherein the first diodes of the battery set are respectively arranged at the first connecting position and the second connecting position, wherein a negative terminal of each first diode is electrically connected with the anode of corresponding the first nickel-zinc battery cell through the first connecting unit and the second connecting unit, wherein a positive terminal of the first diode is electrically connected with the cathode of the first nickel-zinc battery cell through the first connecting unit and the second connecting unit, wherein the first nickel-zinc battery cell arranged at the first position forms a first receiving slot, wherein the first nickel-zinc battery cell arranged at the second position forms a second receiving slot, wherein the first connecting position is formed within the first receiving slot, wherein the second connecting position is formed within the second receiving slot.

The present invention further provides a battery set for nickel-zinc battery system, comprises:

a plurality of first nickel-zinc battery cell;

a connecting device connecting the first cell nickel-zinc batteries of the battery set in series; and a plurality of first diodes, wherein the first diodes of the battery set respectively correspond to the first nickel-zinc battery cells of the battery set, wherein the connecting device comprises at least a first connecting unit and at least a second connecting unit, wherein the first connecting unit and the second connecting unit are both made of conductive material and the first connecting unit and the second connecting unit of the connecting device are alternately arranged, so as to allow each second connecting unit to form a first position with the previous adjacent the first connecting unit, a first connecting position subsequent to the first position, a second position with the subsequent adjacent the first connecting unit, and a second connecting position next to the second position, wherein the nickel-zinc battery cells of the battery set are respectively arranged at the first position and the second position, wherein the first nickel-zinc battery cells of the battery set are arranged to be connected in series through the first connecting unit and the second connecting unit, wherein the first diodes of the battery set are respectively arranged at the first connecting position and the second connecting position, wherein a negative terminal of each first diode is electrically connected with the anode of corresponding the first nickel-zinc battery cell through the first connecting unit and the second connecting unit, wherein a positive terminal of the first diode is electrically connected with the cathode of the first nickel-zinc battery cell through the first connecting unit and the second connecting unit, wherein the first nickel-zinc battery cell arranged at the first position forms a first receiving slot, wherein the first nickel-zinc battery cell arranged at the second position forms a second receiving slot, wherein the first connecting position is formed within the first receiving slot, wherein the second connecting position is formed within the second receiving slot.

The present invention further provides a battery set for nickel-zinc battery system, comprises:

a plurality of first nickel-zinc battery cell;

a connecting device connecting the first cell nickel-zinc batteries of the battery set in series;

a plurality of first diode; and at least a protective plate, wherein the protective plate has a set of protective slots, wherein the first diodes of the battery set respectively correspond to the first nickel-zinc battery cells of the battery set, wherein the connecting device comprises at least a first connecting unit and at least a second connecting unit, wherein the first connecting unit and the second connecting unit are both made of conductive material and the first connecting unit and the second connecting unit of the connecting device are alternately arranged, so as to allow each second connecting unit to form a first position with the previous adjacent the first connecting unit and to form a second position with the subsequent adjacent the first connecting unit, wherein the first nickel-zinc battery cells of the battery set are respectively arranged at the first position and the second position, wherein the first nickel-zinc battery cells of the battery set are arranged to be connected in series through the first connecting unit and the second connecting unit, wherein a negative terminal of each first diode of the battery set is arranged to be electrically connected with the anode of corresponding the first nickel-zinc battery cell through the first connecting unit and the second connecting unit, wherein a positive terminal of the first diode is arranged to be electrically connected with the cathode of the first nickel-zinc battery cell through the first connecting unit and the second connecting unit, wherein the battery set forms two lateral sides, wherein each protective plate is arranged on one of the lateral sides of the battery set, wherein the protective slots of the protective plate are arranged to correspond to the first diodes of the battery set for accommodating the first diodes in the protective slots.

The present invention further provides a connecting device for connecting a plurality of nickel-zinc battery cells in series, which forms a first receiving slot when the nickel-zinc battery cells are arranged at a first position, and a second receiving slot when the nickel-zinc battery cells are arranged at a second position, wherein the connecting device comprises:

at least a first connecting unit; and at least a second connecting unit, wherein the first connecting unit and the second connecting unit are both made of conductive material and the first connecting unit and the second connecting unit of the connecting device are alternately arranged, so as to allow each second connecting unit to form the first position with the previous adjacent the first connecting unit, a first connecting position subsequent to the first position, the second position with the subsequent adjacent the first connecting unit, and a second connecting position next to the second position, wherein the nickel-zinc battery cells are respectively arranged at the first position and the second position, so as to allow the nickel-zinc battery cell to be connected in series through the first connecting unit and the second connecting unit, wherein the first connecting position is arranged within the first receiving slot, wherein the second connecting position is arranged within the second receiving slot.

The present invention further provides a manufacturing method for a connecting device of a nickel-zinc battery set, comprising the following steps:

A) respectively electrically connecting the positive terminal and the negative terminal of a first diode to the first positive connecting portion of a first connecting unit and the second negative connecting portion of a second connecting unit that is subsequent to the first connecting unit, wherein the first cathode connecting portion of the first connecting unit and the second anode connecting portion of the second connecting unit form a first position therebetween;

B) respectively electrically connecting the positive terminal and the negative terminal of another first diode to the second positive connecting portion of a second connecting unit and the first negative connecting portion of a first connecting unit that is subsequent to the second connecting unit, wherein the second cathode connecting portion of the second connecting unit and the first anode connecting portion of the subsequent adjacent first connecting unit form a second position therebetween; and C) repeating the step A) and B) sequentially for N time, wherein N is a integer not less than zero, so as to obtain the connecting device.

The present invention further provides a manufacturing method for nickel-zinc battery set, comprising the following steps:

A) respectively electrically connecting the positive terminal and the negative terminal of a first diode to the first positive connecting portion of a first connecting unit and the second negative connecting portion of a second connecting unit that is subsequent to the first connecting unit, wherein the first cathode connecting portion of the first connecting unit and the second anode connecting portion of the second connecting unit form a first position therebetween;

B) respectively electrically connecting the positive terminal and the negative terminal of another first diode to the second positive connecting portion of a second connecting unit and the first negative connecting portion of a first connecting unit that is subsequent to the second connecting unit, wherein the second cathode connecting portion of the second connecting unit and the first anode connecting portion of the subsequent adjacent first connecting unit form a second position therebetween;

C) repeating the step A) and B) sequentially for N time, wherein N is a integer not less than zero; and D) electrically arranging the first nickel-zinc battery cells at the first position and the second position respectively, wherein the anode and cathode of the first nickel-zinc battery cell arranged at the first position are respectively electrically connected to the second connecting unit and the first connecting unit, wherein the anode and cathode of the first nickel-zinc battery cell arranged at the second position are respectively electrically connected to the first connecting unit and the second connecting unit, wherein the first nickel-zinc battery cell arranged at the first position forms a first receiving slot capable of accommodating the first diode, wherein the first nickel-zinc battery cell arranged at the second position forms a second receiving slot capable of accommodating the first diode.

In order to achieve the above objects, the present invention further provides a battery pack based on nickel-zinc battery comprising a plurality of nickel-zinc battery units, wherein a plurality of the nickel-zinc battery units are arranged in an array manner and are connected through one or more terminal connecting unit and one or more bridge connecting unit.

Preferably, each of the terminal connecting unit comprises two non-coplanar sections, wherein one of the sections is for connecting to a diode, while the other section is for connecting to the nickel-zinc battery unit.

Preferably, each bridge connecting unit comprises a bridging section in the middle and upward or downward bent diode linkage sections respectively extended from the bridging section. The diode linkage section is for the connection to the diode. The bridging section is C shaped, U shaped, V shaped, or W shaped.

Preferably, a plurality of the nickel-zinc batteries comprise three rows respectively having two, two, and three nickel-zinc batteries, so as to form a battery pack that supplies electricity at 12-volt.

Preferably, a plurality of the nickel-zinc batteries comprise three rows, wherein each row has three nickel-zinc batteries, so as to form a battery pack that supplies electricity at 14.4-volt.

Preferably, a plurality of the nickel-zinc batteries comprise three rows respectively having four, three, and two of the nickel-zinc batteries, so as to form a battery pack that supplies electricity at 18-volt.

Preferably, a plurality of the nickel-zinc batteries comprise three rows, wherein each row respectively has four nickel-zinc batteries, so as to form a battery pack that supplies 19.2 electricity at 19.2-volt.

Preferably, a plurality of the nickel-zinc batteries comprise three rows, wherein each row respectively has five nickel-zinc batteries, so as to form a battery pack that supplies electricity at 24-volt.

The present invention also provides an electrical tool, comprising an electrical tool body, wherein the electrical tool body has a battery mounting cavity formed thereon, wherein the battery mounting cavity comprises a battery pack of nickel-zinc battery arranged therein, wherein the battery pack comprises a plurality of nickel-zinc battery units, wherein a plurality of the nickel-zinc battery units are arranged in an array manner and are connected through one or more terminal connecting unit and one or more bridge connecting unit.

The present invention also provides a diode connection string for battery pack, which comprises one or more diodes, wherein the diode is composed by connecting the units selected from the group consisting of a first connecting unit, a second connecting unit, and a third connecting unit.

Here, the first connecting unit comprises non-coplanar battery linkage section and diode linkage section, wherein the second connecting unit comprises a second connecting unit body, second turning sections respectively extended from the second connecting unit body, and upward bent second bending sections respectively extended from the second turning section, wherein the second bending section is for connecting to the diode, wherein the third connecting unit comprises a third connecting unit body, third turning sections respectively extended from the third connecting unit body, and upward bent third bending sections respectively extended from the third turning section, wherein the third bending section is for connecting to the diode, wherein when one diode connection string only has one diode, two first connecting units will be utilized to connect the diode, wherein the diode will be connected between the diode linkage sections of two first connecting units, wherein when one diode connection string only has three diodes, two first connecting units, one second connecting unit, and one third connecting unit are utilized to cascade the three diodes, wherein two first connecting units are at the two ends, wherein one diode is connected between the first the first connecting unit and one third connecting unit, wherein the second the diode is connected between the third connecting unit and the second connecting unit, wherein the third the diode is connected between the second connecting unit and another the first connecting unit, such that three diodes are cascaded together, wherein when one diode connection string only has four diodes, two first connecting units, one second connecting unit, and two third connecting units are utilized to cascade the four diodes, wherein two first connecting units are at the two ends, wherein one diode is connected between the first the first connecting unit and one third connecting unit, wherein the second the diode is connected between the third connecting unit and the second connecting unit, wherein the third the diode is connected between the second connecting unit and another the third connecting unit, such that four diodes are cascaded together, wherein when one diode connection string only has five diodes, two first connecting units, two second connecting units, and two third connecting units are utilized as the structure to cascade the five diodes, wherein two first connecting units are at the two ends, wherein one diode is connected between the first the first connecting unit and the first the third connecting unit, wherein the second the diode is connected between the first the third connecting unit and the first the second connecting unit, wherein the third the diode is connected between the first the second connecting unit and the second the third connecting unit, wherein the fourth the diode is connected between the second the third connecting unit and the second second connecting unit, wherein the fifth the diode is connected between the second the second connecting unit and the second the first connecting unit, wherein the diode strings that have one, three, four, and five of the diodes serve as basic diode connection string structures, wherein the diode string with more diodes can be obtained by analogizing from the basic diode connection string structure.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 6B is a flow diagram of another manufacturing method for the connecting device of a battery set of the nickel-zinc battery system according to the above first preferred embodiment of the present invention.

FIG. 11B is a flow diagram of another manufacturing method for a battery set of the nickel-zinc battery system according to the above second preferred embodiment the present invention.

FIG. 17 illustrates a ways of making a connection string with a diode for the nickel-zinc battery system according to the above third preferred embodiment of the present invention.

FIG. 18 illustrates a ways of making a connection string with three diodes for the nickel-zinc battery system according to the above third preferred embodiment of the present invention.

FIG. 19 illustrates a ways of making a connection string with four diodes for the nickel-zinc battery system according to the above third preferred embodiment of the present invention.

FIG. 20 illustrates a ways of making a connection string with five diodes for the nickel-zinc battery system according to the above third preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following is disclosed in order that those skilled in the art can make and use the present invention. Preferred embodiments in the following descriptions are obvious examples and modifications for those skilled in the art, which shall not limit the scope of the present invention. The basic notions defined in the following descriptions may by applied to other implementations, alternatives, modifications, equivalences, and applications without deviating the scope or spirit of the present invention.

Figure 1:
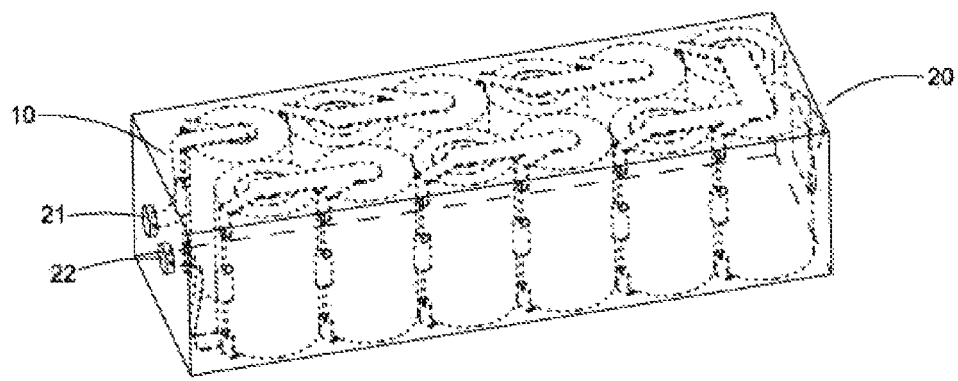
FIG. 1 is a perspective elevation of the nickel-zinc battery system according to a first preferred embodiment of the present invention.

Referring to FIGS. 1-4, the nickel-zinc battery system according to a first preferred embodiment of the present invention is illustrated. The nickel-zinc battery system (or battery pack) comprises at least a battery set 10, wherein each battery set 10 has a positive pole 101 and a negative pole 102. The battery set 10 comprises a plurality of first nickel-zinc battery cells 11 and a connecting device 12 to connect each first nickel-zinc battery cell 11 of the battery set 10 in series. The connecting device 12 comprises at least a first connecting unit 121 and at least a second connecting unit 122. The first connecting unit 121 and the second connecting unit 122 are both made of conductive material. The first connecting unit 121 and the second connecting unit 122 of the connecting device 12 are alternately arranged, such that each second connecting unit 122 can form a first position 1201 with its previous adjacent first connecting unit 121 (if any) and form a second position 1202 with its subsequent adjacent first connecting unit 121 (if any). In other words, the first connecting unit 121 can form the first position 1201 with a subsequent adjacent second connecting unit 122 (if any) and form a second position 1202 with a previous adjacent second connecting unit 122 (if any). Referring to FIG. 1, preferably, the nickel-zinc battery system may comprise a set of battery packs 10 connected in series, wherein the positive poles 101 of a first battery packs 10 forms the anode of the nickel-zinc battery system, while the negative poles 102 of a last battery packs 10 forms the cathode of the nickel-zinc battery system. Alternatively, the nickel-zinc battery system comprises a set of parallel connected battery packs 10. The positive poles 101 of all the battery packs 10 are integrated to form the anode of the nickel-zinc battery system, while the negative poles 102 of all the battery packs 10 are integrated to form the cathode of the nickel-zinc battery system.

Referring to FIGS. 1-4, the first nickel-zinc battery cells 11 of the battery set 10 of the nickel-zinc battery system according to a first preferred embodiment of the present invention are respectively arranged at the first position 1201 and the second position 1202. All of the first nickel-zinc battery cells 11 of the battery set 10 are connected in series through the first connecting unit 121 and the second connecting unit 122. In other words, if the anode of the first nickel-zinc battery cell 11 of the battery set 10 arranged at the first position 1201 is connected to the first connecting unit 121, the cathode of the first nickel-zinc battery cell 11 is connected to the second connecting unit 122 subsequently next by the first connecting unit 121, and the cathode of the first nickel-zinc battery cell 11 arranged at the second position 1202 is connected to the first connecting unit 121. Also, the anode of the first nickel-zinc battery cell 11 is connected to the previous second connecting unit 122 next by the first connecting unit 121. Alternatively, the cathode of the first nickel-zinc battery cell 11 of the battery set 10 arranged at the first position 1201 is connected to the first connecting unit 121. The anode of the first nickel-zinc battery cell 11 is connected to the second connecting unit 122 subsequently next by the first connecting unit 121. The anode of the first nickel-zinc battery cell 11 arranged at the second position 1202 is connected to the first connecting unit 121. The cathode of the first nickel-zinc battery cell 11 is connected to the previous second connecting unit 122 next by the first connecting unit 121. Therefore, the first nickel-zinc battery cell 11 arranged at the first position 1201 and the first nickel-zinc battery cell 11 arranged at the second position 1202 are connected from head to tail through the first connecting unit 121 and the second connecting unit 122, so as to connect each first nickel-zinc battery cell 11 of the battery set 10 together in series through the first connecting unit 121 and the second connecting unit 122.

Figure 2:
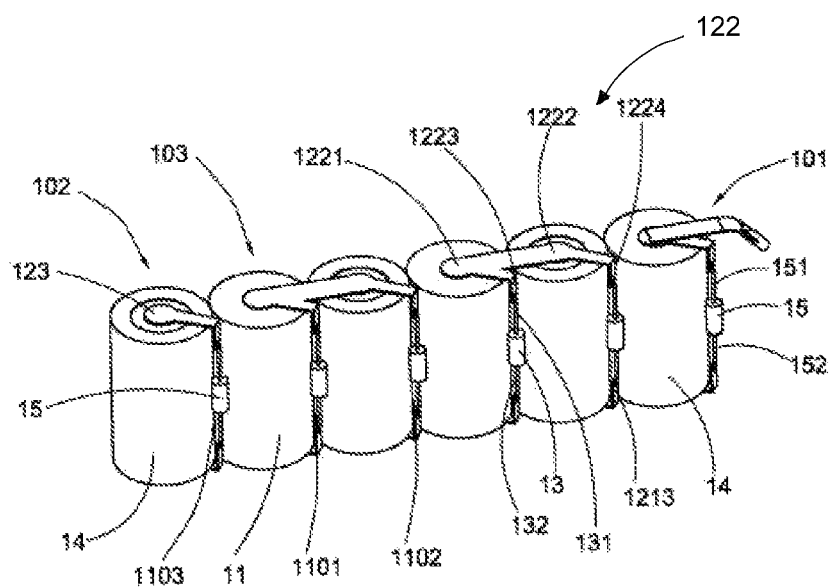
FIG. 2 is a perspective view of a battery set of the nickel-zinc battery system according to the above first preferred embodiment of the present invention.
Figure 3:
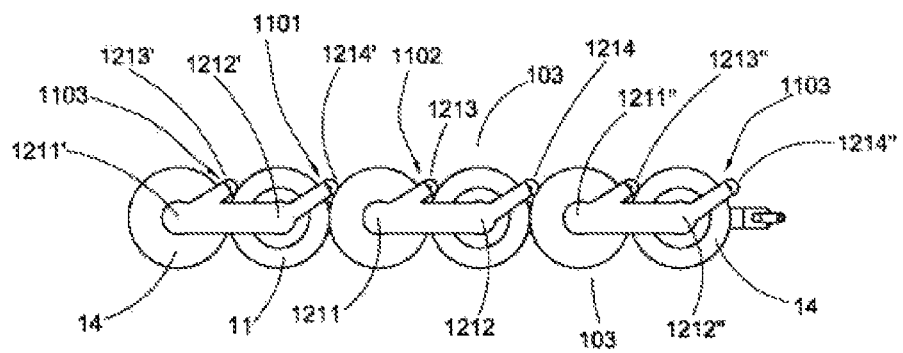
FIG. 3 is a worm's eye view of a battery set of the nickel-zinc battery system according to the above first preferred embodiment of the present invention.
Figure 4:
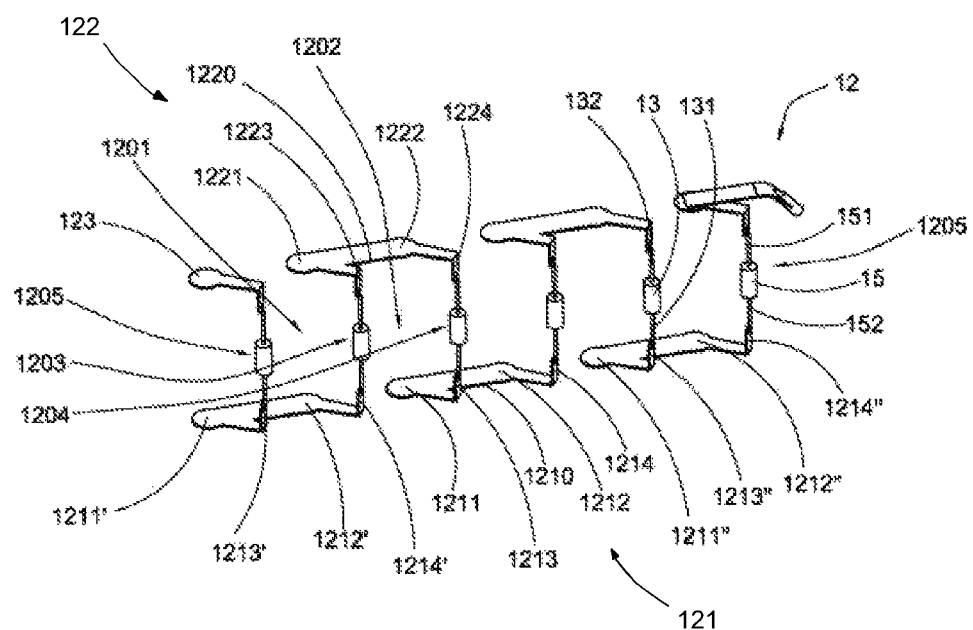
FIG. 4 is a perspective view of a connecting device of the nickel-zinc battery system according to the above first preferred embodiment of the present invention.

Referring to FIGS. 2 and 4, the nickel-zinc battery system according to a first preferred embodiment of the present invention further comprises a set of first diodes 13. The first diodes 13 of the nickel-zinc battery system are respectively arranged between the anode and cathode of the first nickel-zinc battery cell 11 of the battery set 10. A negative terminal 131 of the first diode 13 is electrically connected to the anode of the first nickel-zinc battery cell 11. A positive terminal 132 of the first diode 13 is electrically connected to the cathode of the first nickel-zinc battery cell 11. That is to say, the negative terminal 131 of the first diode 13 of the nickel-zinc battery system arranged between the anode and cathode of the nickel-zinc battery cell 11 of the battery set 10 is connected to the anode of the first nickel-zinc battery cell 11, while the positive terminal 132 thereof is electrically connected to the cathode of the first nickel-zinc battery cell 11. The first diode 13 of the battery set 10 of the nickel-zinc battery system according to the present invention is arranged to avoid the continuing discharging of a medium low capacity first nickel-zinc battery cell 11 or first nickel-zinc battery cell 11 having low capacity (relative to high capacity first nickel-zinc battery cell 11 or first nickel-zinc battery cell 11 having high capacity), but to affect the discharging of the medium high capacity first nickel-zinc battery cell 11 or first nickel-zinc battery cell 11 having high capacity of the battery set 10, such that each first nickel-zinc battery cell 11 of the battery set 10 can discharge in a default way and avoid over-discharging. The above arrangement of each first nickel-zinc battery cell 11 of the battery set 10 of the nickel-zinc battery system according to the present invention helps to prevent issues of poor discharging performance caused by the inconsistence among each first nickel-zinc battery cell 11 of the battery set 10 and short cycle life of the entire battery set (or the nickel-zinc battery system). Preferably, each first nickel-zinc battery cell 11 of the battery set 10 corresponds to at least one of the first diodes 13.

It should be noted that the first diode 13 of the nickel-zinc battery system according to a first preferred embodiment of the present invention is preferably a silicon diode, germanium diode, or Schottky barrier diode. More preferably, the first diode 13 is a silicon diode or a Schottky barrier diode. Most preferably, the first diode 13 is a Schottky barrier diode.

Referring to FIGS. 2 and 4, the first nickel-zinc battery cell 11 of the battery set 10 of the nickel-zinc battery system according to a first preferred embodiment of the present invention arranged at the first position 1201 forms a first receiving slot 1101, while the first nickel-zinc battery cell 11 of the battery set 10 arranged at the second position 1202 forms a second receiving slot 1102. The first receiving slot 1101 is adjacent to the first position 1201. The second receiving slot 1102 is adjacent to the second position 1202. The first diodes 13 of the nickel-zinc battery system are respectively arranged in the first receiving slot 1101 and the second receiving slot 1102. It is understandable that because the first diodes 13 are respectively arranged in the first receiving slot 1101 and the second receiving slot 1102, even the first diodes 13 of the first nickel-zinc battery cell 11 arranged at the two ends (the positive pole 101 and the negative pole 102) of the battery set 10 are not likely to be impacted by external force and damaged. The rest of the first diodes 13 are further coveredly arranged between two adjacent first nickel-zinc battery cells 11 of the battery set 10, which furthest avoids the first diodes from being impacted by external force and damaged. Those skilled in the art should be able to understand that the first nickel-zinc battery cells 11 of the battery set 10 can have any shape for forming the shape of the first receiving slot 1101 and the second receiving slot 1102. For example, the first nickel-zinc battery cells 11 can be cylindrical, so as to form the first receiving slot 1101 and the second receiving slot 1102 (when they are respectively placed at the first position 1201 and the second position 1202), as FIGS. 2 and 4 illustrated.

Referring to FIGS. 2 and 4, the connecting device 12 of the nickel-zinc battery system according to a first preferred embodiment of the present invention comprises at least two first connecting units 121 and at least a second connecting unit 122. Each second connecting unit 122 is arranged between two adjacent first connecting units 121, such that each second connecting unit 122 can form a first connecting position 1203 with the previous first connecting unit 121 of the two adjacent first connecting units 121 and form a second connecting position 1204 with the subsequent first connecting unit 121 of the two adjacent first connecting units 121. The first connecting position 1203 is arranged in the first receiving slot 1101. The second connecting position 1204 is arranged in the second receiving slot. The first diodes 13 of the battery set 10 are respectively arranged at the first connecting position 1203 and the second connecting position 1204, such that the first diodes 13 of the battery set 10 are respectively arranged in the first receiving slot 1101 and the second receiving slot.

Referring to FIGS. 1-4, each first connecting unit 121 of the connecting device 12 of the nickel-zinc battery system according to a first preferred embodiment of the present invention comprises a first anode connecting portion 1211, a first cathode connecting portion 1212 extended from the first anode connecting portion 1211, a first negative connecting portion 1213 upward extended from the first anode connecting portion 1211, and a first positive connecting portion 1214 upward extended from the first cathode connecting portion 1212, wherein each second connecting unit 122 comprises a second anode connecting portion 1221, a second cathode connecting portion 1222 extended from the second anode connecting portion 1221, a second negative connecting portion 1223 downward extended from the second anode connecting portion 1221, and a second positive connecting portion 1224 downward extended from the second cathode connecting portion 1222, wherein the second anode connecting portion 1221 of each second connecting unit 122 and the first cathode connecting portion 1212 of the previous adjacent first connecting unit 121 form said first position 1201, wherein the second cathode connecting portion 1222 of the second connecting unit 122 and the first anode connecting portion 1211 of the subsequent adjacent first connecting unit 121 form said second position 1202, wherein the second negative connecting portion 1223 of the second connecting unit 122 and the first positive connecting portion 1214 of the previous adjacent first connecting unit 121 form the first connecting position 1203 therebetween, wherein the second positive connecting portion 1224 of the second connecting unit 122 and the first negative connecting portion 1213 of the subsequent adjacent first connecting unit 121 form the second connecting position 1204 therebetween. Those skilled in the art should be able to understand that the anode of the first nickel-zinc battery cell 11 of the battery set 10 arranged at the first position 1201 can be electrically connected second anode connecting portion 1221 of the second connecting unit 122, while the cathode thereof can be electrically connected to the first cathode connecting portion 1212 of the previous adjacent first connecting unit 121. Also, the anode of the first nickel-zinc battery cell 11 of the battery set 10 arranged at the second position 1202 can be electrically connected to the first anode connecting portion 1211 of the subsequent adjacent first connecting unit 121, while the cathode thereof can be electrically connected to the second cathode connecting portion 1222 of the second connecting unit 122. Besides, the negative terminal 131 of the first diode 13 arranged at the first connecting position 1203 is electrically connected to the second negative connecting portion 1223 of the second connecting unit 122, while the positive terminal 132 is electrically connected to the first positive connecting portion 1214 of the first connecting unit 121 adjacent to the second connecting unit 122. The positive terminal 132 of the first diode 13 arranged at the second connecting position 1204 is electrically connected to the second positive connecting portion 1224 of the second connecting unit 122. The negative terminal 131 is electrically connected to the first negative connecting portion 1213 of the first connecting unit 121 subsequently adjacent to the second connecting unit 122. In other words, the positive terminal 132 and the negative terminal 131 of the first diode 13 of the battery set 10 are respectively electrically connected to the cathode and the anode of the first nickel-zinc battery cell 11 through the first connecting unit 121 and the second connecting unit 122.

Referring to FIGS. 1-4, preferably, the second negative connecting portion 1223 of the second connecting unit 122 and the first positive connecting portion 1214 of the first connecting unit 121 of the connecting device 12 are respectively arranged in the first receiving slot 1101 formed by the first nickel-zinc battery cell 11 of the battery set 10, wherein the first negative connecting portion 1213 of the first connecting unit 121 and the second positive connecting portion 1224 of the second connecting unit 122 are respectively arranged in the second receiving slot 1102 formed by the first nickel-zinc battery cell 11 of the battery set 10.

Referring to FIGS. 1-4, the battery set 10 has two lateral sides 103 formed thereon. The first connecting position 1203 and the second connecting position 1204 formed by the second connecting unit 122 and the first connecting unit 121 are arranged on the same lateral side 103 of the battery set 10. Correspondingly, the first receiving slot 1101 and the second receiving slot 1102 formed by the first nickel-zinc battery cell 11 of the battery set 10 are formed on the same lateral side 103 of the battery set 10. In other words, each second connecting unit 122 of the connecting device 12 has two lateral rims 1220 formed thereon, wherein the second negative connecting portion 1223 and the second positive connecting portion 1224 of the second connecting unit 122 of the connecting device 12 are respectively arranged on the second anode connecting portion 1221 and the second cathode connecting portion 1222, wherein the second positive connecting portion 1224 and the second negative connecting portion 1223 are respectively downward extended from the same lateral rim 1220 of the second connecting unit 122, wherein each first connecting unit 121 of the connecting device 12 has two lateral edges 1210 formed thereon, wherein the first positive connecting portion 1214 and the first negative connecting portion 1213 of the first connecting unit 121 of the connecting device 12 are respectively arranged on the first cathode connecting portion 1212 and the first anode connecting portion 1211, wherein the first positive connecting portion 1214 and the first cathode connecting portion 1213 are respectively upward extended from the same lateral edges 1210 of the first connecting unit 121, such that the first connecting position 1203 and the second connecting position 1204 formed by the second connecting unit 122 and the first connecting unit 121 of the connecting device 12 are respectively arranged on the same lateral side 103 of the battery set 10.

Referring to FIGS. 1-4, the two end first connecting units 121' and 121" formed by the connecting device 12 of the battery set 10 of the nickel-zinc battery system according to a first preferred embodiment of the present invention respectively form the negative pole 102 and the positive pole 101 of the battery set 10. For instance, the first cathode connecting portion 1212' of one of the end first connecting units 121' of the battery set 10 forms the negative pole 102 of the battery set 10, while the first anode connecting portion 1211" of another end first connecting unit 121" of the battery set 10 forms the positive pole 101 of the battery set 10.

Referring to FIGS. 1-4, the battery set 10 of the nickel-zinc battery system according to a first preferred embodiment of the present invention further comprises two second nickel-zinc battery cells 14 and two second diodes 15. The connecting device 12 of the battery set 10 further comprises two third connecting units 123, wherein the two second nickel-zinc battery cells 14 of the battery set 10 are respectively arranged at the two end first connecting units 121' and 121" of the connecting device 12 of the battery set 10. The cathode and anode of one of the second nickel-zinc battery cell 14 of the battery set 10 are respectively connected to one of the third connecting unit 123 and the first anode connecting portion 1211' of an end first connecting unit 121'. The anode and cathode of another second nickel-zinc battery cell 14 are respectively connected to another third connecting unit 123 and the first cathode connecting portion 1212" of another end first connecting unit 121". Therefore, the two third connecting units 123 of the connecting device 12 of the battery set 10 respectively form the positive pole 101 and the negative pole 102 of the battery set 10. The positive terminal 152 and the negative terminal 151 of each second diode 15 of the battery set 10 are respectively electrically connected to the anode and cathode of a second nickel-zinc battery cell 14 through the third connecting unit 123 and the first connecting unit 121' (or 121").

Referring to FIGS. 1-4, each second nickel-zinc battery cell 14 of the battery set 10 respectively has a third receiving slot 1103 formed thereon. Two second diodes 15 of the battery set 10 are arranged to be able to be respectively arranged in the third receiving slot 1103. Therefore, all diodes of the battery set 10, comprising the first diode 13 and the second diode 15, can be arranged in the first receiving slot 1101, the second receiving slot 1102, and the third receiving slot 1103 formed by the battery set 10. Preferably, every of the end first connecting unit 121' and 121" of the connecting device 12 of the battery set 10 has two lateral edges 1210' or 1210" formed thereon. The two third receiving slots 1103 formed by two second nickel-zinc battery cells 14 of the battery set 10 are arranged to face toward their adjacent first nickel-zinc battery cells 11 respectively. The first negative connecting portion 1213' and the first positive connecting portion 1214' of an end first connecting unit 121' of the connecting device 12 of the battery set 10 are respectively upward extended from the two lateral edges 1210' of the first connecting unit 121'. The first negative connecting portion 1213' and the first positive connecting portion 1214' of another end first connecting unit 121" of the connecting device 12 are respectively upward extended from the two lateral edges 1210' of the first connecting unit 121", such that the first negative connecting portion 1213' of an end first connecting unit 121' and the first positive connecting portion 1214' of another end first connecting unit 121' of the connecting device 12 are respectively arranged in the two third receiving slots 1103 formed by the second nickel-zinc battery cell 14 and the first nickel-zinc battery cells 11 of the battery set 10 and the two second diodes 15 of the battery set 10 can both be coveredly arranged in the third receiving slot 1103. Therefore, all diodes of the battery set 10, comprising the first diode 13 and the second diode 15, can be coveredly arranged in the first receiving slot 1101, the second receiving slot 1102, and the third receiving slot 1103 formed by the battery set 10. In other words, the third connecting units 123 of the connecting device 12 are respectively coveredly arranged in the third receiving slot 1103 with the two third connecting positions 1205 formed by the two end first connecting units 121' and 121" of the connecting device 12. The second diodes 15 of the battery set 10 are respectively coveredly arranged at the third connecting position 1205.

It should be noted that the first anode connecting portion 1211, the first cathode connecting portion 1212, the first negative connecting portion 1213, and the first positive connecting portion 1214 of the first connecting unit 121 of the battery set 10 are all laminated shaped, such that the first anode connecting portion 1211, the first cathode connecting portion 1212, the first negative connecting portion 1213, and the first positive connecting portion 1214 of the first connecting unit 121 can be integrally formed. In other words, the first anode connecting portion 1211, the first cathode connecting portion 1212, the first negative connecting portion 1213, and the first positive connecting portion 1214 of the first connecting unit 121 can be cut from the same big sheet metal. Similarly, the second anode connecting portion 1221, the second cathode connecting portion 1222, the second negative connecting portion 1223, and the second positive connecting portion 1224 of the second connecting unit 122 of the battery set 10 can be arranged into laminated shape and be integrally formed. In other words, the second anode connecting portion 1221, the second cathode connecting portion 1222, the second negative connecting portion 1223, and the second positive connecting portion 1224 of the second connecting unit 122 can be cut from the same big sheet metal. The lamellose structure of the first connecting unit 121 and the second connecting unit 122 of the battery set 10 facilitate mass production of the first connecting unit 121 and the second connecting unit 122.

Figure 5A:
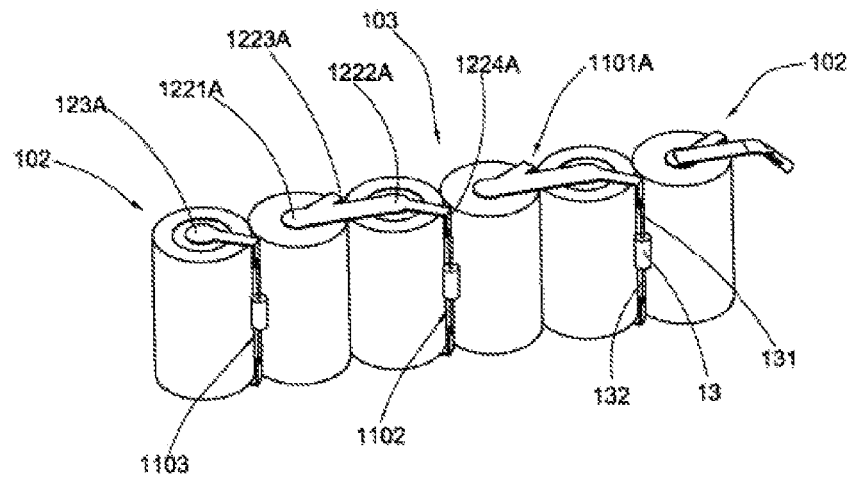
FIG. 5A illustrates an alternative of a battery set of the nickel-zinc battery system according to the above first preferred embodiment of the present invention.
Figure 5B:
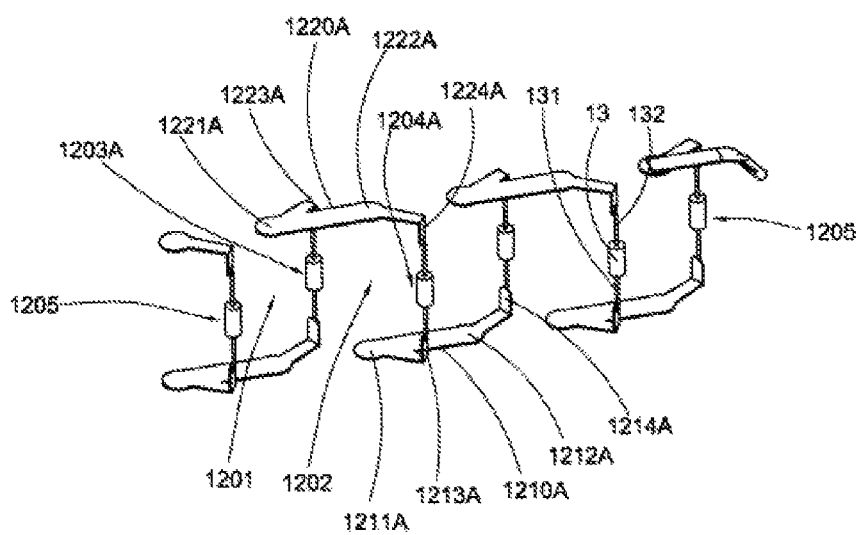
FIG. 5B illustrates an alternative of the connecting device of the battery set of the nickel-zinc battery system according to the above first preferred embodiment of the present invention.

FIGS. 5A and 5B illustrated an alternative of the connecting device 12 of the battery set 10 of the nickel-zinc battery system according to a first preferred embodiment of the present invention. The first connecting position 1203A and the second connecting position 1204A formed by the first connecting unit 121A of the second connecting unit 122A of the connecting device 12A are respectively arranged on the two lateral sides 103 of the battery set 10. Correspondingly, the first receiving slot 1101 and the second receiving slot 1102 formed by the first nickel-zinc battery cell 11 of the battery set 10 are respectively formed on the two lateral sides 103 of the battery set 10. Referring to FIGS. 5A-5B, each second connecting unit 122A of the connecting device 12A has two lateral rims 1220A formed thereon, wherein the second negative connecting portion 1223A and the second positive connecting portion 1224A of the second connecting unit 122A of the connecting device 12A are respectively arranged on the second anode connecting portion 1221A and the second cathode connecting portion 1222A, wherein the second positive connecting portion 1224A and the second negative connecting portion 1223A are respectively downward extended from the two lateral rims 1220A of the second connecting unit 122A, wherein each first connecting unit 121A of the connecting device 12A has two lateral edges 1210A formed thereon, wherein the first positive connecting portion 1214A and the first negative connecting portion 1213A of the first connecting unit 121A of the connecting device 12A are respectively arranged on the first cathode connecting portion 1212A and the first anode connecting portion 1211A, wherein the first positive connecting portion 1214A and the first cathode connecting portion 1213A are respectively upward extended from the two lateral edges 1210A of the first connecting unit 121A, such that the first connecting position 1203A and the second connecting position 1204A formed by the second connecting unit 122A and the first connecting unit 121A of the connecting device 12A are respectively arranged on two lateral sides 103 of the battery set 10.

Referring to FIG. 1, the nickel-zinc battery system according to a first preferred embodiment of the present invention may comprise a set of battery packs 10 connected in series, wherein the positive poles 101 of a first battery packs 10 of the nickel-zinc battery system forms the anode of the nickel-zinc battery system, while the negative poles 102 of a last battery packs 10 forms the cathode of the nickel-zinc battery system. Alternatively, the nickel-zinc battery system comprises a set of parallel connected battery packs 10. The positive poles 101 of all the battery packs 10 are integrated to form the anode of the nickel-zinc battery system, while the negative poles 102 of all the battery packs 10 are integrated to form the cathode of the nickel-zinc battery system.

Figure 7:
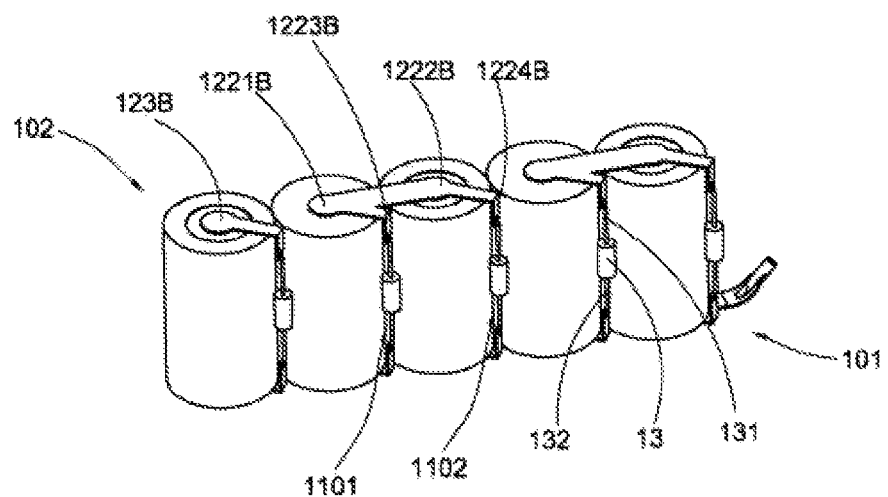
FIG. 7 is a perspective view of a battery set of the nickel-zinc battery system according to a second preferred embodiment of the present invention.
Figure 8:
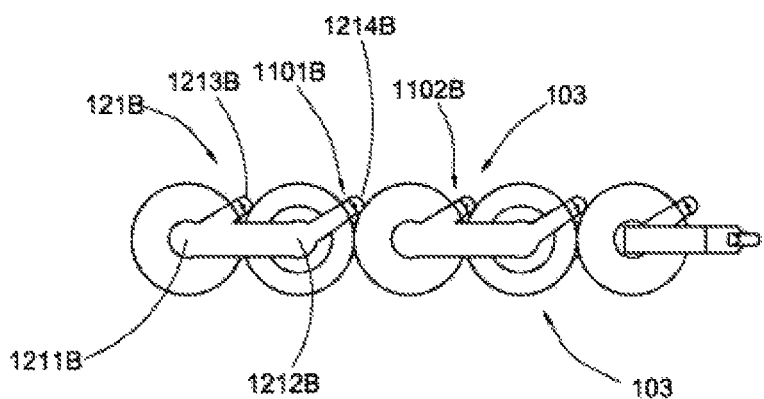
FIG. 8 is a worm's eye view of a battery set of the nickel-zinc battery system according to the above second preferred embodiment of the present invention.
Figure 9:
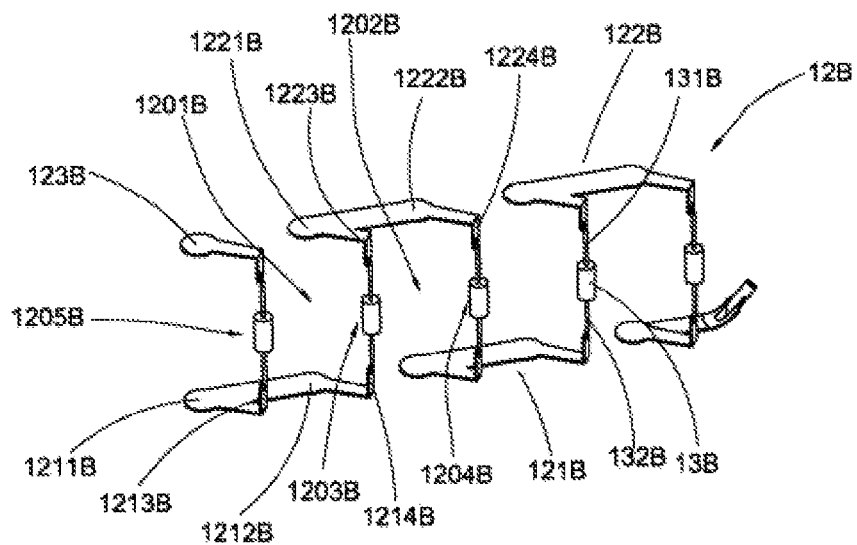
FIG. 9 is a perspective view of a connecting device of the battery set of the nickel-zinc battery system according to the above second preferred embodiment of the present invention.

Referring to FIGS. 7-9, the nickel-zinc battery system according to a second preferred embodiment of the present invention is illustrated. The nickel-zinc battery system (or battery pack) comprises at least a battery set 10B, wherein each battery set 10B has a positive pole 101B and a negative pole 102B. The battery set 10 comprises a plurality of first nickel-zinc battery cells 11B and a connecting device 12B to connect each first nickel-zinc battery cell 11B of the battery set 10B in series. The connecting device 12 comprises at least a first connecting unit 121B and at least a second connecting unit 122B. The first connecting unit 121B and the second connecting unit 122B are both made of conductive material. The first connecting unit 121B and the second connecting unit 122B of the connecting device 12B are alternately arranged, such that each second connecting unit 122B can form a first position 1201B with its previous adjacent first connecting unit 121B (if any) and form a second position 1202B with its subsequent adjacent first connecting unit 121B (if any). In other words, the first connecting unit 121B can form the first position 1201B with a subsequent adjacent second connecting unit 122B (if any) and form a second position 1202B with a previous adjacent second connecting unit 122B (if any).

Referring to FIGS. 7-9, similarly, the first nickel-zinc battery cells 11B of the battery set 10B of the nickel-zinc battery system according to a second preferred embodiment of the present invention are respectively arranged at the first position 1201B and the second position 1202B. All of the first nickel-zinc battery cells 11B of the battery set 10B are connected in series through the first connecting unit 121B and the second connecting unit 122B. Therefore, the first nickel-zinc battery cell 11B arranged at the first position 1201B and the first nickel-zinc battery cell 11B arranged at the second position 1202B are connected from head to tail through the first connecting unit 121B and the second connecting unit 122B, so as to connect each first nickel-zinc battery cell 11B of the battery set 10B together in series through the first connecting unit 121B and the second connecting unit 122B.

Referring to FIGS. 7 and 9, the nickel-zinc battery system according to a second preferred embodiment of the present invention further comprises a set of first diodes 13B. The first diodes 13B are respectively arranged between the anode and cathode of the first nickel-zinc battery cell 11B of the battery set 10B. A negative terminal 131 of the first diode 13B is electrically connected to the anode of the first nickel-zinc battery cell 11B. A positive terminal 132 of the first diode 13B is electrically connected to the cathode of the first nickel-zinc battery cell 11B. It should be noted that the first diode 13B of the nickel-zinc battery system according to a second preferred embodiment of the present invention is preferably a silicon diode, germanium diode, or Schottky barrier diode. More preferably, the first diode 13B is a silicon diode or a Schottky barrier diode. Most preferably, the first diode 13B is a Schottky barrier diode.

Referring to FIGS. 7 and 9, similarly, the first nickel-zinc battery cell 11B of the battery set 10B of the nickel-zinc battery system according to a second preferred embodiment of the present invention arranged at the first position 1201B forms a first receiving slot 1101B, while the first nickel-zinc battery cell 11B of the battery set 10B arranged at the second position 1202B forms a second receiving slot 1102B. The first receiving slot 1101B is adjacent to the first position 1201B. The second receiving slot 1102B is adjacent to the second position 1202B. The first diodes 13B of the nickel-zinc battery system are respectively arranged in the first receiving slot 1101B and the second receiving slot 1102B. It is understandable that because the first diodes 13B are respectively arranged in the first receiving slot 1101B and the second receiving slot 1102B, even the first diodes 13B of the first nickel-zinc battery cell 11B arranged at the two ends (the positive pole 101B and the negative pole 102B) of the battery set 10B are not likely to be impacted by external force and damaged. The rest of the first diodes 13B are further coveredly arranged between two adjacent first nickel-zinc battery cells 11B of the battery set 10B, which furthest avoids the first diodes from being impacted by external force and damaged.

Referring to FIGS. 7 and 9, the connecting device 12B of the nickel-zinc battery system according to a second preferred embodiment of the present invention comprises at least two first connecting units 121B and at least a second connecting unit 122B, such that each second connecting unit 122B can form a first connecting position 1203B with the previous first connecting unit 121B of the two adjacent first connecting units 121B and form a second connecting position 1204B with the subsequent first connecting unit 121B of the two adjacent first connecting units 121B. The first connecting position 1203B is arranged in the first receiving slot 1101B. The second connecting position 1204B is arranged in the second receiving slot. The first diodes 13B of the battery set 10B are respectively arranged at the first connecting position 1203B and the second connecting position 1204B, such that the first diodes 13B of the battery set 10B are respectively arranged in the first receiving slot 1101B and the second receiving slot. Hence, the nickel-zinc battery system according to the above second preferred embodiment of the present invention is different to the nickel-zinc battery system according to the above first preferred embodiment of the present invention in that the connecting device 12B of the nickel-zinc battery system according to the above second preferred embodiment of the present invention form an end first connecting unit 121B' and an end second connecting unit 122B'.

Referring to FIGS. 7-9, similarly, each first connecting unit 121B of the connecting device 12B of the nickel-zinc battery system according to a second preferred embodiment of the present invention comprises a first anode connecting portion 1211B, a first cathode connecting portion 1212B extended from the first anode connecting portion 1211B, a first negative connecting portion 1213B upward extended from the first anode connecting portion 1211B, and a first positive connecting portion 1214B upward extended from the first cathode connecting portion 1212B, wherein each second connecting unit 122B comprises a second anode connecting portion 1221B, a second cathode connecting portion 1222B extended from the second anode connecting portion 1221B, a second negative connecting portion 1223B downward extended from the second anode connecting portion 1221B, and a second positive connecting portion 1224B downward extended from the second cathode connecting portion 1222B, wherein the second anode connecting portion 1221B of each second connecting unit 122B and the first cathode connecting portion 1212B of the previous adjacent first connecting unit 121B form said first position 1201B, wherein the second cathode connecting portion 1222B of the second connecting unit 122B and the first anode connecting portion 1211B of the subsequent adjacent first connecting unit 121B form said second position 1202B, wherein the second negative connecting portion 1223B of the second connecting unit 122B and the first positive connecting portion 1214B of the previous adjacent first connecting unit 121B form the first connecting position 1203B therebetween, wherein the second positive connecting portion 1224B of the second connecting unit 122B and the first negative connecting portion 1213B of the subsequent adjacent first connecting unit 121B form the second connecting position 1204B therebetween. Preferably, the second negative connecting portion 1223B of the second connecting unit 122B and the first positive connecting portion 1214B of the first connecting unit 121B of the connecting device 12B are respectively arranged in the first receiving slot 1101B formed by the first nickel-zinc battery cell 11B of the battery set 10B, wherein the first negative connecting portion 1213B of the first connecting unit 121B and the second positive connecting portion 1224B of the second connecting unit 122B are respectively arranged in the second receiving slot 1102B formed by the first nickel-zinc battery cell 11B of the battery set 10B.

Referring to FIGS. 7-9, the battery set 10B has two lateral sides 103B formed thereon. The first connecting position 1203B and the second connecting position 1204B formed by the second connecting unit 122B and the first connecting unit 121B are arranged on the same lateral side 103B of the battery set 10B. Correspondingly, the first receiving slot 1101B and the second receiving slot 1102B formed by the first nickel-zinc battery cell 11B of the battery set 10B are formed on the same lateral side 103B of the battery set 10B.

Referring to FIGS. 7-9, the connecting device 12B of the battery set 10B of the nickel-zinc battery system according to the above second preferred embodiment of the present invention forms an end first connecting unit 121B' and an end second connecting unit 122B', wherein the end first connecting unit 121B' of the connecting device 12B forms the negative pole 101B of the battery set 10B, while the end second connecting unit 122B' forms the positive pole 101B of the battery set 10B. Alternatively, the end first connecting units 121B' of the battery set 10B forms the positive pole 101B of the battery set 10B, while the end second connecting unit 122B' of the battery set 10B forms the negative pole 102B of the battery set 10B.

Referring to FIGS. 7-9, the battery set 10B of the nickel-zinc battery system according to a second preferred embodiment of the present invention further comprises two second nickel-zinc battery cells 14B and two second diodes 15B. The connecting device 12B of the battery set 10B further comprises two third connecting units 123B, wherein the two second nickel-zinc battery cells 14B of the battery set 10B are respectively arranged at the end first connecting unit 121B' and the end second connecting unit 122B' of the connecting device 12B of the battery set 10B. The cathode and anode of one of the second nickel-zinc battery cell 14B of the battery set 10B are respectively connected to one of the third connecting unit 123B and the first anode connecting portion 1211B' of an end first connecting unit 121B'. The anode and cathode of another second nickel-zinc battery cell 14B are respectively connected to another third connecting unit 123B and the first cathode connecting portion 1222B' of the end second connecting unit 122B'. Therefore, the two third connecting units 123B of the connecting device 12B of the battery set 10B respectively form the positive pole 101B and the negative pole 102B of the battery set 10B. The positive terminal 152 and the negative terminal 151 of each second diode 15B of the battery set 10B are respectively electrically connected to the anode and cathode of a second nickel-zinc battery cell 14B through the third connecting unit 123B and the first connecting unit 121B' (or end second connecting unit 122B').

Referring to FIGS. 7-9, each second nickel-zinc battery cell 14B of the battery set 10B respectively has a third receiving slot 1103B formed thereon. Two second diodes 15B of the battery set 10B are arranged to be able to be respectively arranged in the third receiving slot 1103B. Therefore, all diodes of the battery set 10B, comprising the first diode 13B and the second diode 15B, can be arranged in the first receiving slot 1101B, the second receiving slot 1102B, and the third receiving slot 1103B formed by the battery set 10B. Preferably, the end first connecting unit 121B' of the connecting device 12B of the battery set 10B has two lateral edges 1210B formed thereon. The end second connecting unit 122B' has two lateral rims 1220B' formed thereon. The two third receiving slots 1103B formed by two second nickel-zinc battery cells 14B of the battery set 10B are arranged to face toward their adjacent first nickel-zinc battery cells 11B respectively. The first negative connecting portion 1213B' and the first positive connecting portion 1214B' of the end first connecting unit 121B' of the connecting device 12B of the battery set 10B are respectively upward extended from the two lateral edges 1210B' of the first connecting unit 121B'. The second negative connecting portion 1223B' and the second positive connecting portion 1224B' of the end second connecting unit 122B' of the connecting device 12B are respectively downward extended from two lateral rims 1220B' of the second connecting unit 122B', such that the first negative connecting portion 1213B' of the end first connecting unit 121B' and the second positive connecting portion 1224B' of the end second connecting unit 122B' of the connecting device 12B are respectively arranged in the two third receiving slots 1103B formed by the second nickel-zinc battery cells 14B of the battery set 10B and the second diodes 15B of the battery set 10B are respectively coveredly arranged at the third connecting position 1205B. In other words, the two third connecting units 123B of the connecting device 12B are respectively coveredly arranged in the third receiving slot 1103B with the two third connecting positions 1205B formed by the end first connecting unit 121B' and the end second connecting unit 122B' of the connecting device 12B.

Similarly, the first anode connecting portion 1211B, the first cathode connecting portion 1212B, the first negative connecting portion 1213B, and the first positive connecting portion 1214B of the first connecting unit 121B of the battery set 10B can be arranged into laminated shape, such that the first anode connecting portion 1211B, the first cathode connecting portion 1212B, the first negative connecting portion 1213B, and the first positive connecting portion 1214B of the first connecting unit 121B can be integrally formed. In other words, the first anode connecting portion 1211B, the first cathode connecting portion 1212B, the first negative connecting portion 1213B, and the first positive connecting portion 1214B of the first connecting unit 121B can be cut from the same big sheet metal. Besides, the second anode connecting portion 1221B, the second cathode connecting portion 1222B, the second negative connecting portion 1223B, and the second positive connecting portion 1224B of the second connecting unit 122B can be arranged into laminated shape and be integrally formed. In other words, the second anode connecting portion 1221B, the second cathode connecting portion 1222B, the second negative connecting portion 1223B, and the second positive connecting portion 1224B of the second connecting unit 122B can be cut from the same big sheet metal. The lamellose structure of the first connecting unit 121B and the second connecting unit 122B of the battery set 10B facilitate mass production of the first connecting unit 121B and the second connecting unit 122B.

Figure 10A:
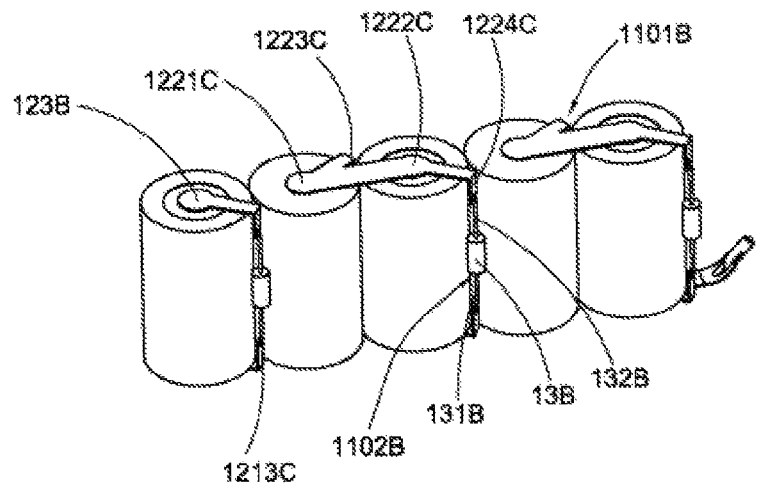
FIG. 10A illustrates an alternative of a battery set of the nickel-zinc battery system according to the above second preferred embodiment of the present invention.
Figure 10B:
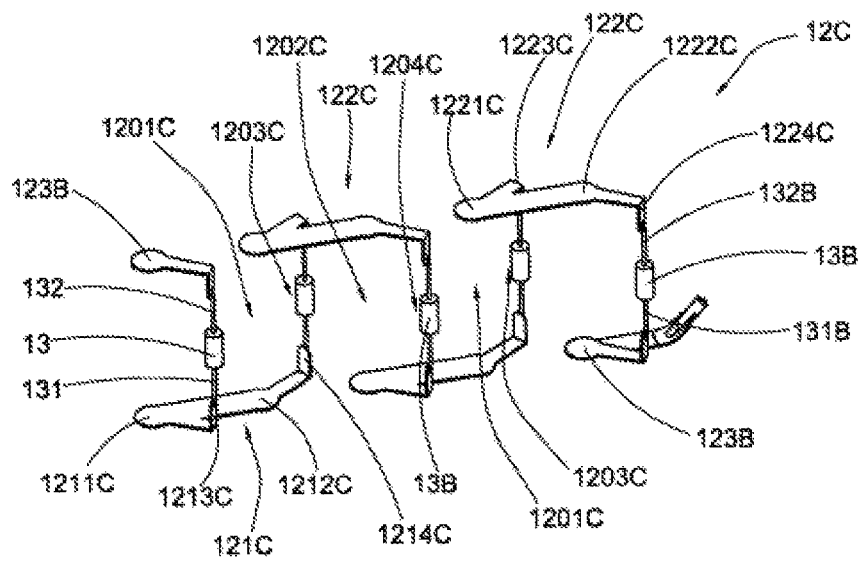
FIG. 10B illustrates an alternative of the connecting device of the battery set of the nickel-zinc battery system according to the above second preferred embodiment of the present invention.

FIGS. 10A and 10B illustrated an alternative of the connecting device 12B of the battery set 10B of the nickel-zinc battery system according to a second preferred embodiment of the present invention. The first connecting position 1203C and the second connecting position 1204C formed by the first connecting unit 121C of the second connecting unit 122C of the connecting device 12C are respectively arranged on the two lateral sides 103B of the battery set 10B. Correspondingly, the first receiving slot 1101B and the second receiving slot 1102B formed by the first nickel-zinc battery cell 11B of the battery set 10B are respectively formed on the two lateral sides 103B of the battery set 10B. Referring to FIGS. 10A-10B, each second connecting unit 122C of the connecting device 12C has two lateral rims 1220C formed thereon, wherein the second negative connecting portion 1223C and the second positive connecting portion 1224C of the second connecting unit 122C of the connecting device 12C are respectively arranged on the second anode connecting portion 1221C and the second cathode connecting portion 1222C, wherein the second positive connecting portion 1224C and the second negative connecting portion 1223C are respectively downward extended from the two lateral rims 1220C of the second connecting unit 122C, wherein each first connecting unit 121C of the connecting device 12C has two lateral edges 1210C formed thereon, wherein the first positive connecting portion 1214C and the first negative connecting portion 1213C of the first connecting unit 121C of the connecting device 12C are respectively arranged on the first cathode connecting portion 1212C and the first anode connecting portion 1211C, wherein the first positive connecting portion 1214C and the first cathode connecting portion 1213C are respectively upward extended from the two lateral edges 1210C of the first connecting unit 121C, such that the first connecting position 1203C and the second connecting position 1204C formed by the second connecting unit 122C and the first connecting unit 121C of the connecting device 12C are respectively arranged on two lateral sides 103B of the battery set 10B.

Figure 12A:
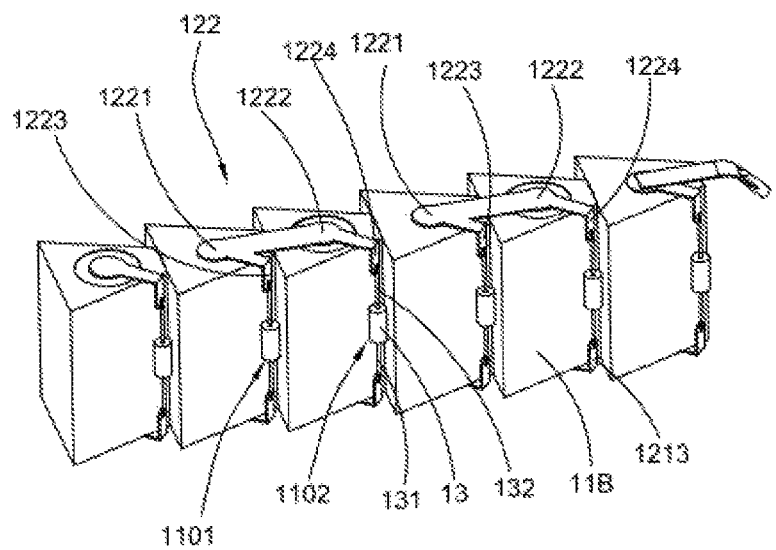
FIG. 12A illustrates an alternative of a battery set of the nickel-zinc battery system according to the above preferred embodiment of the present invention.

FIG. 12A illustrated an alternative of the nickel-zinc battery cells 11 (11B, 14, 14B) of the battery set 10 (10B) of the nickel-zinc battery system according to a preferred embodiment of the present invention, wherein the nickel-zinc battery cell 11D is prism shaped, such as quadrangular prism shaped, and the quadrangular prism is able to form a receiving slot on at least one of its sides, such that when the nickel-zinc battery cells 11 are arranged at the corresponding positions, they can respectively form space for accommodating the diodes 13 of the battery set 10 therein.

Figure 12B:
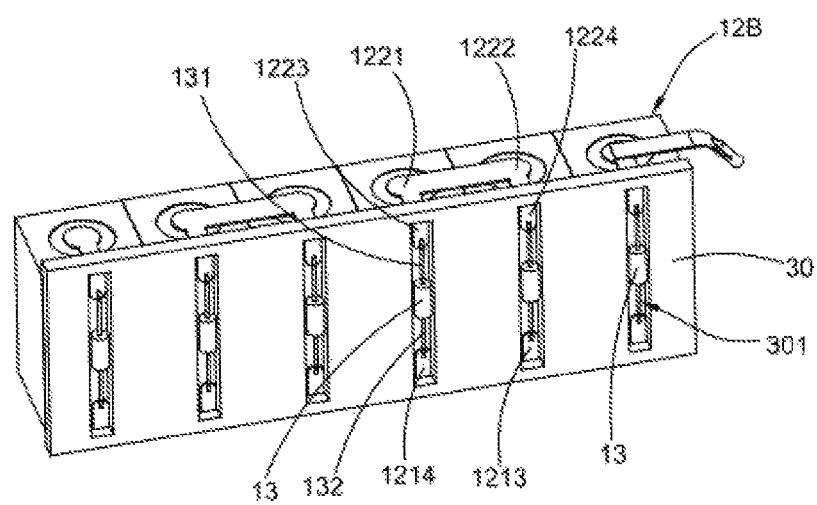
FIG. 12B illustrates another alternative of a battery set of the nickel-zinc battery system according to the above preferred embodiment of the present invention.

FIG. 12B illustrated an alternative of the nickel-zinc battery cells 11 (11B, 14, 14B) of the battery set 10 (10B) of the nickel-zinc battery system according to a preferred embodiment of the present invention, wherein a side of the nickel-zinc battery cell 11E is plane. The battery set 10 further comprises at least a protective plate 30. The protective plate 30 has a set of protective slots 301. The first diodes 13 of the battery set 10 respectively correspond to the first nickel-zinc battery cells 11E of the battery set 10. The battery set 10 forms two lateral sides. Each protective plate 30 is arranged on a lateral side of the battery set 10. The protective slots 301 of the protective plate 30 are arranged to respectively correspond to the first diodes 13 of the battery set 10 and can accommodate the first diodes in the protective slots 301.

Figure 13:
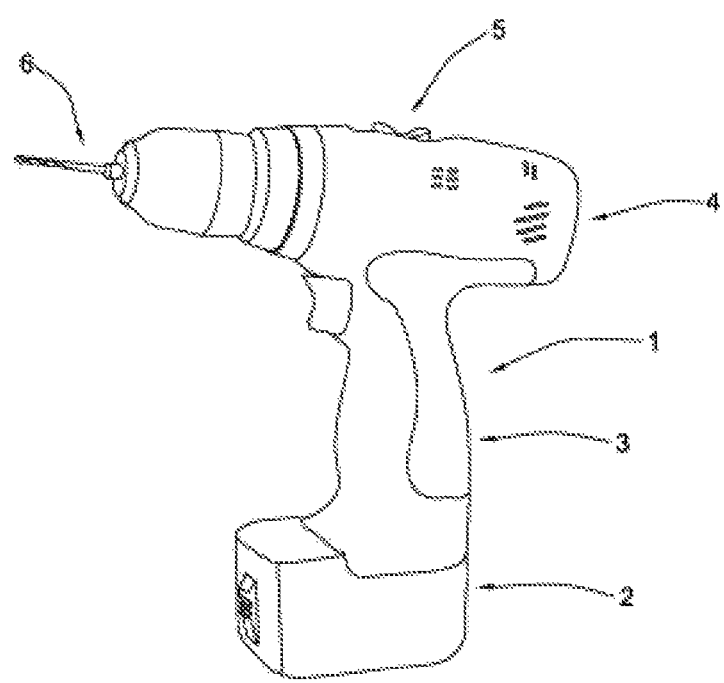
FIG. 13 illustrates an electrical tool of the nickel-zinc battery system according to the above preferred embodiment of the present invention.

FIG. 13 illustrated a rechargeable electrical tool, such as a electric drill, that is able to utilize the nickel-zinc battery system (or battery set) according to the present invention. It comprises a nickel-zinc battery system 2 for providing electric power, a electric motor 4 electrically connected to the nickel-zinc battery system 2, a transmission mechanism 5, and a working portion 6. The transmission mechanism 5 is arranged between the electric motor 4 and the working portion 6. The transmission mechanism 5 is arranged for being able to transfer the driving force generated by the electric motor 4 to the working portion 6, such that the working portion 6 can be driven to implement the functions of the electrical tool 1. Those skilled in the art should be able to understand that the rechargeable electrical tool can be an electric drill, electric hammer, electric planer, concrete vibrator, electric wrench, electric screwdriver, electric saw, electric impact drill, and other rechargeable electrical tool that can utilize the nickel-zinc battery system of the present invention as its power source.

Those skilled in the art should be able to understand that the first nickel-zinc battery cells 11 of the battery set 10 can be in other shape that can form the first receiving slot 1101 and the second receiving slot 1102.

Those skilled in the art should be able to understand that the first nickel-zinc battery cells 11 (11B, 11D, 11E) and the second nickel-zinc battery cells 14 (14B, 14D, 14E) in the present specification both refer to basic battery composition units to form or compose the nickel-zinc battery system of the present invention.

FIGS. 14-30 illustrated the battery pack based on nickel-zinc battery according to a third preferred embodiment of the present invention. The battery pack based on nickel-zinc battery of the present invention is environmental friendly, non-pollutant to the environment, without memory effect, highly efficient, high in multiplying power discharging, and highly secure.

Figure 14:
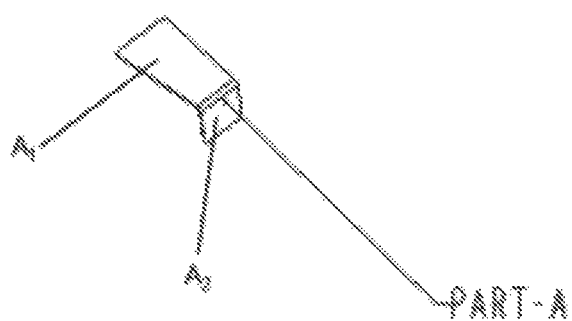
FIGS. 14-16 are perspective views of three types of connecting units of the nickel-zinc battery system according to a third preferred embodiment of the present invention.
Figure 15:
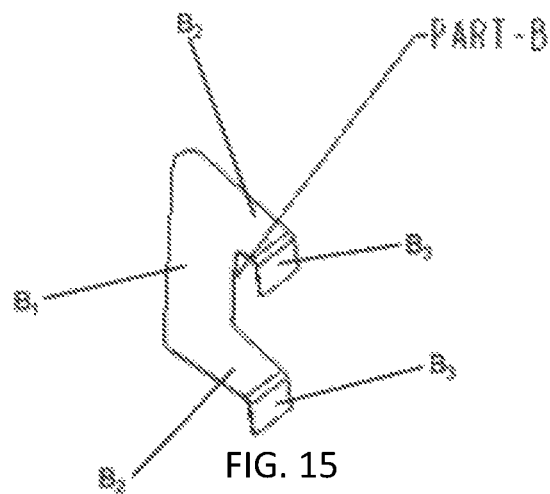
Figure 16:
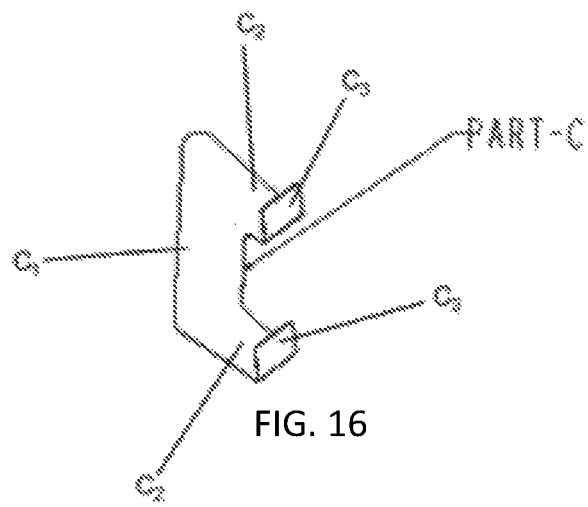

Specifically, FIGS. 14-16 illustrated the first connecting unit A, the second connecting unit B, and the third connecting unit C for welding with the diodes. The first connecting unit A comprises two interconnected sections, the A1 section and the A2 section. The A1 section and the A2 section are formed through bending, such that A2 section is non-coplanarly extended from the A1 section. The A2 section is a diode linkage section adapted for connecting with diode. The A1 section is a battery linkage section for connecting with the anode or cathode of the battery unit.

The second connecting unit B comprises a second main body section B1, second turning sections B2 respectively extended from the second main body section B1, and second bending sections B3 respectively upward bent from the second turning section B1. Two of the second bending section B3 can be utilized for connecting with diode. The second main body section B1 and two of the second turning section B2 can be utilized for connecting to the anode and the cathode of the battery unit.

The third connecting unit C comprises a third main body section C1, third turning sections C2 respectively extended from the third main body section C1, and third bending sections C3 respectively downward bent from the third turning section C1. Two of the third bending sections C3 can be utilized for connecting with diode. The third main body section C1 and two of the third turning sections C2 can be utilized for connecting to the anode and the cathode of the battery unit.

It is worth to mention that the above three standard connecting pieces are formed through quick stamping and edgefolding. It allows fast mass production with low cost. In addition, the above first connecting unit A is equivalent to a terminal connecting unit, which is usually arranged at an end. The second connecting unit B and the third connecting unit C are equivalent to bridge connecting units. The bridge connecting unit comprises a bridging portion in the middle thereof that can be C-shaped, U-shaped, V-shaped, W-shaped, and etc. It also comprises diode linkage sections upward or downward bent from the portion.

FIGS. 17-20 illustrated four basic connection modes of diode connection string. Theses basic diode connection strings can be rapidly formed through automatic or semi-automatic welding for being assembled into battery packs of various voltage classes.

FIG. 17 illustrated a structure of two first connecting units A for connecting a diode. Here, a diode is connected between two first connecting units A and the two ends of the diode are respectively connected with the diode linkage sections A2 of the first connecting units A.

Referring to FIG. 18, a structure that two first connecting units A, a second connecting unit B, and a third connecting unit C are utilized to cascade three diodes is illustrated. Here, two first connecting unit A are at two ends. Referring to FIG. 18, there are a diode connected between a first first connecting unit A and a third connecting unit C, a second diode connected between the above third connecting unit C and a second connecting unit B, and a third diode connected between the above second connecting unit B and another first connecting unit A, such that the three diodes are cascaded.

It is worth to mention that the diode linkage sections B3 and C3 of the second connecting unit B and the third connecting unit C are respectively arranged toward the direction of the diode, such that the entire structure becomes more compact.

Referring to FIG. 19, a structure that two first connecting units A, a second connecting unit B, and two third connecting units C are utilized to cascade four diodes is illustrated. Here, two first connecting unit A are at two ends. Referring to FIG. 19, there are a diode connected between a first first connecting unit A and a third connecting unit C, a second diode connected between the above third connecting unit C and a second connecting unit B, a third diode connected between the above second connecting unit B and a second third connecting unit C, and a fourth diode connected between another first connecting unit A and the above second third connecting unit C, such that the four diodes are cascaded.

That is to say, comparing to FIG. 17, the embodiment illustrated in FIG. 19 actually has one more third connecting unit C, so that it can have one more diode connected.

Referring to FIG. 20, a structure that two first connecting units A, two second connecting units B, and two third connecting units C are utilized to cascade five diodes is illustrated. Here, two first connecting unit A are at two ends. Referring to FIG. 19, there are a diode connected between a first first connecting unit A and a first third connecting unit C, a second diode connected between the above first third connecting unit C and a first second connecting unit B, a third diode connected between the above first second connecting unit B and a second third connecting unit C, a fourth diode connected between the above second third connecting unit C and a second second connecting unit B, and a fifth diode connected between the above second second connecting unit B and a second first connecting unit A.

That is to say, comparing to FIG. 19, the embodiment illustrated in FIG. 20 actually has one more second connecting unit B, so that it can have one more diode connected than the structure illustrated in FIG. 19. Therefore, it can have five diodes connected.

The present invention has designs of assembling and welding clamps of battery pack of various voltage classes. One can choose different diode connection strings based on his need, automatic or semi-automatic feed corresponding quantity of battery unit into these connection strings, fix them with assembling clamps, and put them on the automatic welding apparatus, so as to continuously and fast mass weld and assemble battery packs. Here, referring to FIGS. 21-30, we list the welding compositions of the battery pack of 12V, 14.4V, 18V, 19.2V, and 24V that are common in the electrical tool market.

Figure 21:
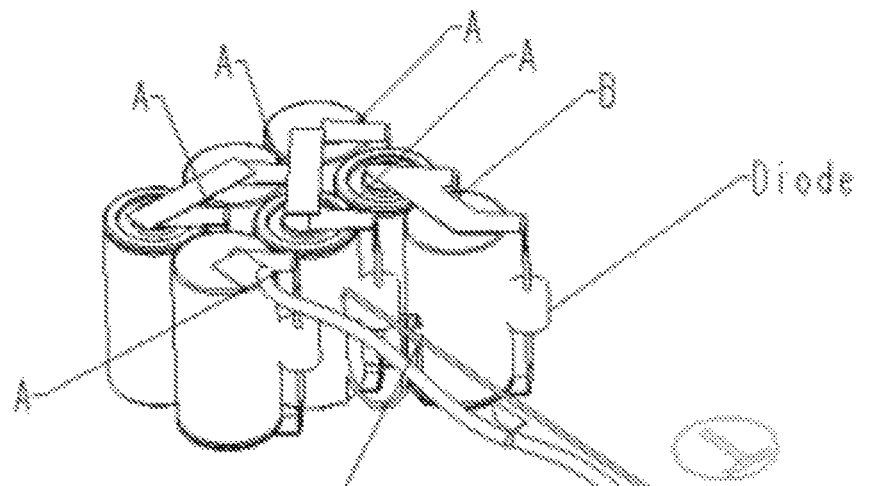
FIGS. 21 and 22 illustrate welding manners of a 12-volt battery pack of the nickel-zinc battery system according to the above second preferred embodiment of the present invention from front and back.
Figure 22:
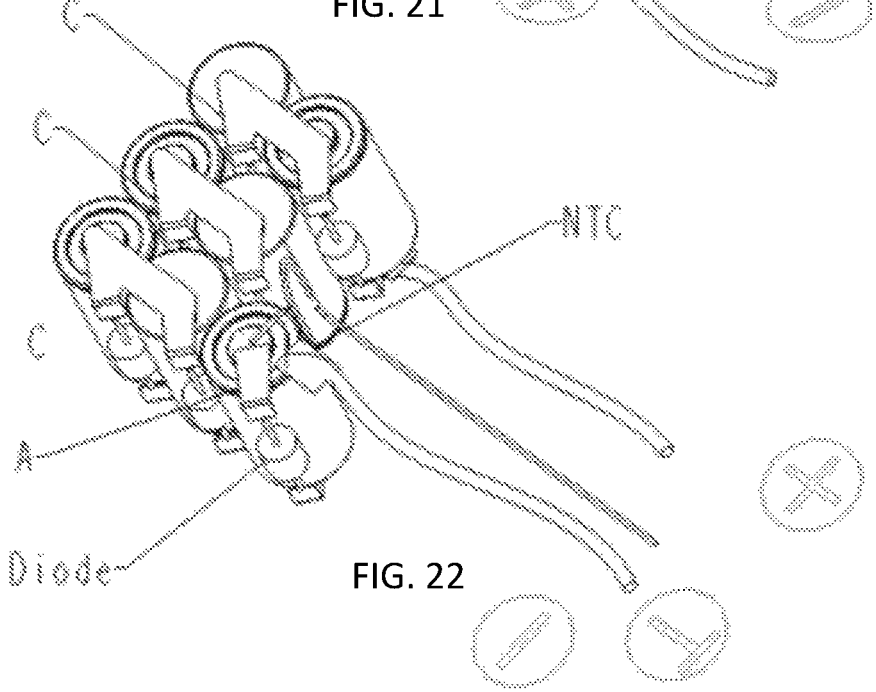

FIGS. 21 and 22 illustrated perspective views of the structure of the 12-volt battery pack formed of 7 battery units. It comprises three rows of resistance sets, wherein the first two rows have two battery units each, while the last row has three battery units. The battery unit here is preferably nickel-zinc battery unit. The 7 battery units are connected through the above connecting unit A, B, and C. Referring to FIG. 21, five first connecting units A and a second connecting unit B are illustrated. Tow first connecting units A between two rows have to be connected together. Referring to FIG. 22, a first connecting unit A and three third connecting units C are illustrated.

Figure 23:
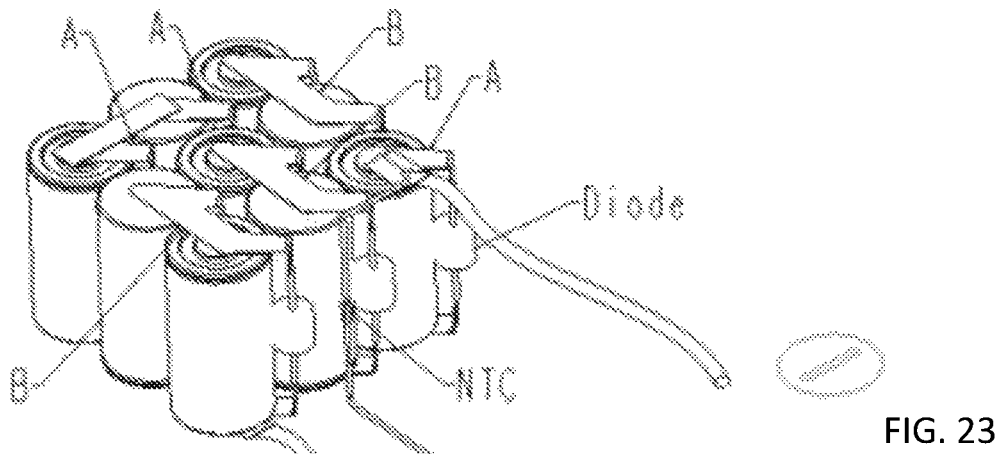
FIGS. 23 and 24 illustrate welding manners of a 14.4-volt battery pack of the nickel-zinc battery system according to the above third preferred embodiment of the present invention from front and back.
Figure 24:
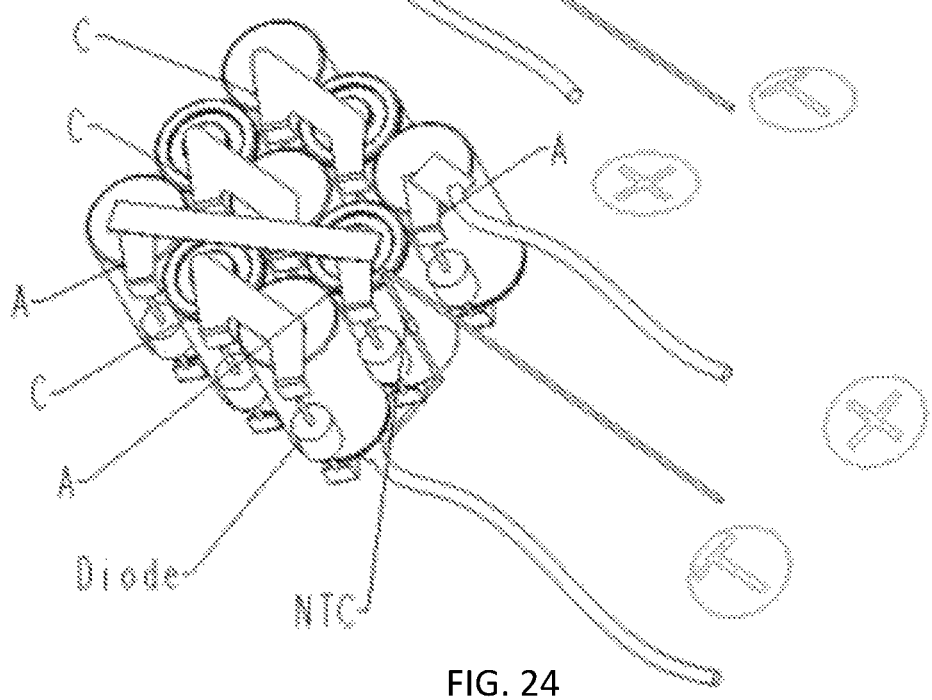

FIGS. 23 and 24 illustrated perspective views of the structure of the 14.4-volt battery pack formed of 9 battery units. It comprises three rows of resistance sets. Each row has three battery units. The battery unit certainly here is preferably nickel-zinc battery unit. The 9 battery units are connected through the above connecting unit A, B, and C. Referring to FIG. 23, three first connecting units A and three second connecting units B are illustrated. Similarly, two first connecting units A between different rows are connected together according to the needs. Referring to FIG. 24, three first connecting units A and three third connecting units C are illustrated. The connection mode of each row may refer to the connection mode illustrated in FIG. 18.

Figure 25:
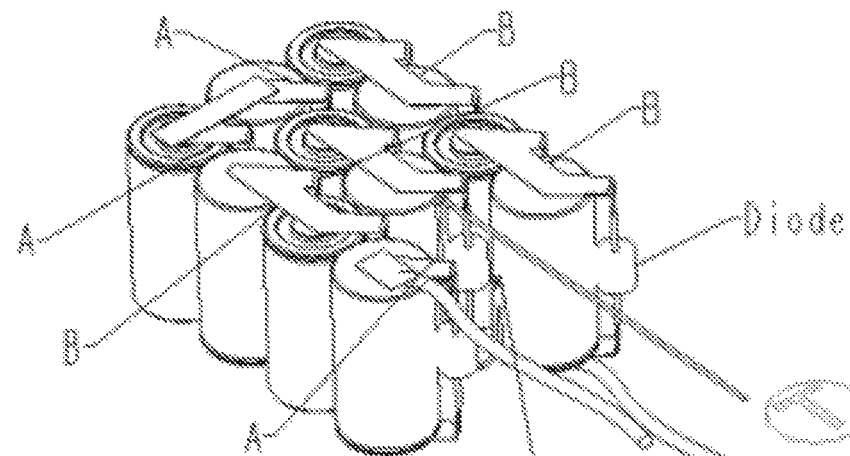
FIGS. 25 and 26 illustrate welding manners of a 18-volt battery pack of the nickel-zinc battery system according to the above third preferred embodiment of the present invention from front and back.
Figure 26:
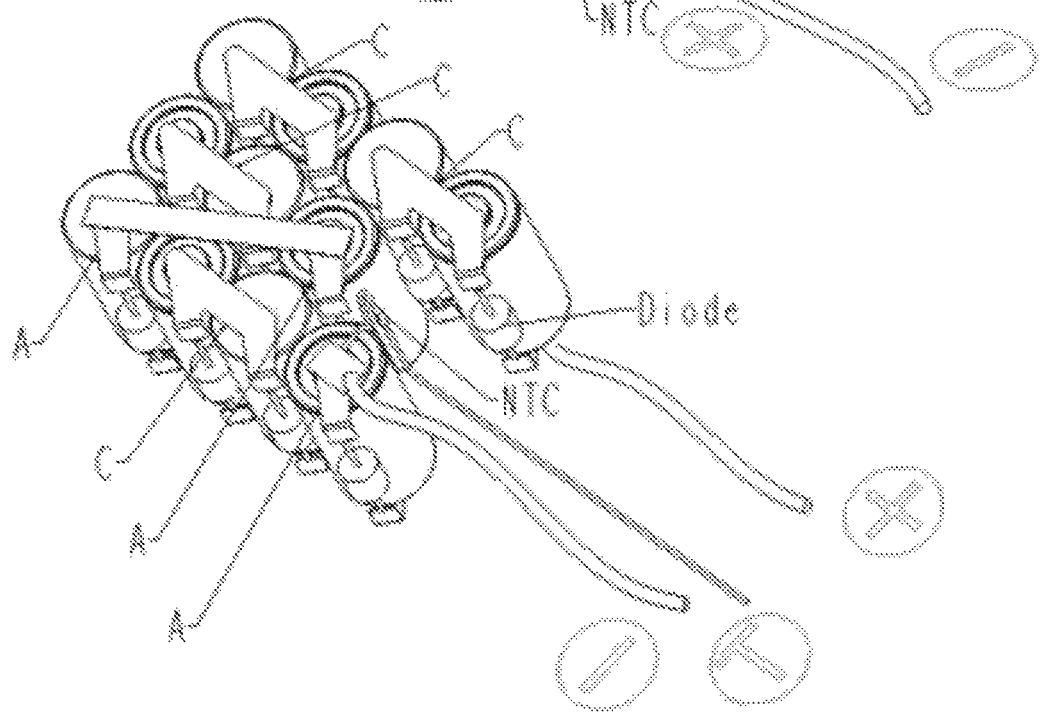

FIGS. 25 and 26 illustrated perspective views of the structure of the 18-volt battery pack formed of 11 battery units. It comprises three rows of resistance sets, wherein the middle row has three battery units, while the two side rows respectively have four battery units. Of course, the battery unit mentioned here is preferably nickel-zinc battery. The 11 battery units are connected through the above connecting unit A, B, and C. Referring to FIG. 25, three first connecting units A and four second connecting units B are illustrated. Similarly, two first connecting units A between different rows are connected together according to the needs. Referring to FIG. 26, three first connecting units A and four third connecting units C are illustrated. The connection mode of the three battery units can refer to the connection mode illustrated in FIG. 18. The connection mode of the four battery units may refer to the connection mode illustrated in FIG. 19.

Figure 27:
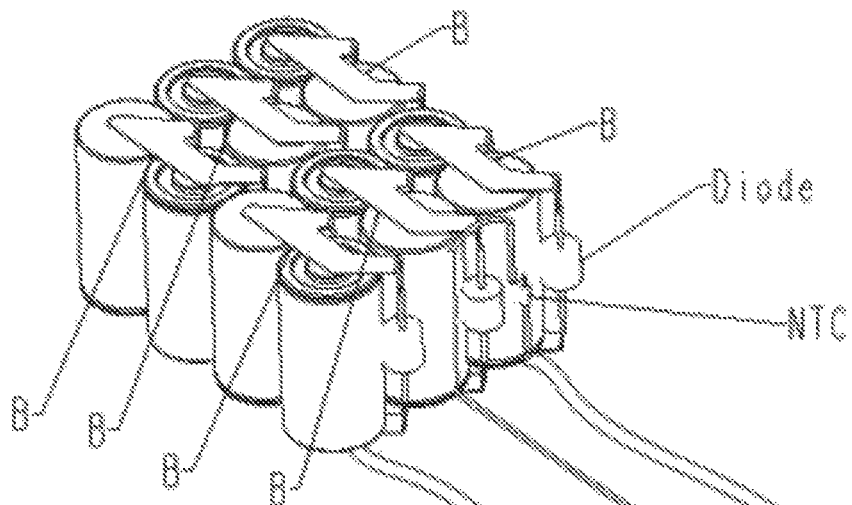
FIGS. 27 and 28 illustrate welding manners of a 19.2-volt battery pack of the nickel-zinc battery system according to the above third preferred embodiment of the present invention from front and back.
Figure 28:
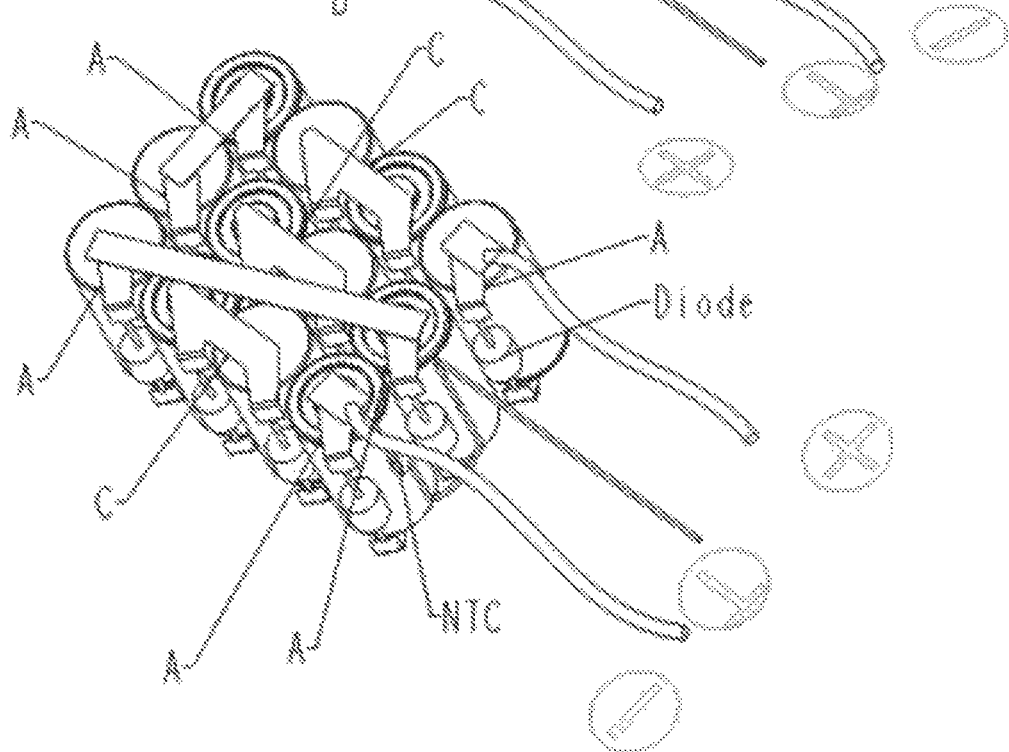

FIGS. 27 and 28 illustrated perspective views of the structure of the 19-volt battery pack formed of 12 battery units. It comprises three rows of resistance sets. Each row has four battery units. Of course, the battery unit mentioned here is preferably nickel-zinc battery. The 12 battery units are connected through the above connecting unit A, B, and C. FIG. 27 illustrated six second connecting units B. FIG. 28 illustrated that the connection mode of four battery units with six first connecting units A and three third connecting units C may apply the connection mode illustrated in FIG. 19, where two first connecting units A are connected between rows depending on the needs.

Figure 29:
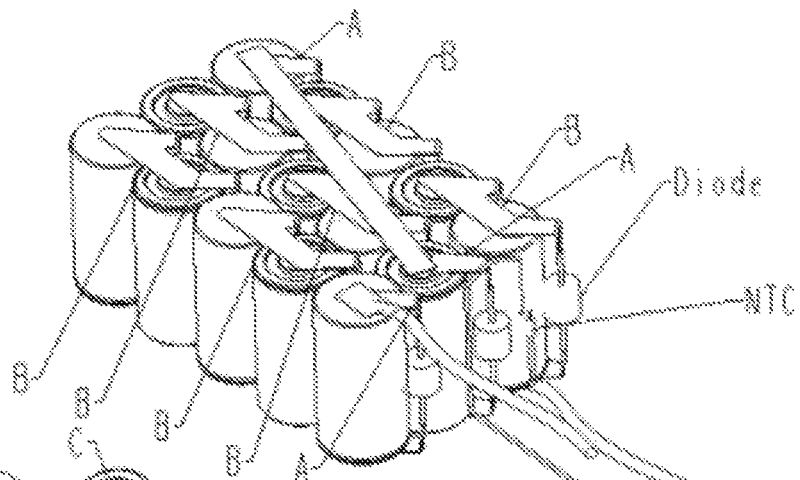
FIGS. 29 and 30 illustrate welding manners of a 24-volt battery pack of the nickel-zinc battery system according to the above third preferred embodiment of the present invention from front and back.
Figure 30:
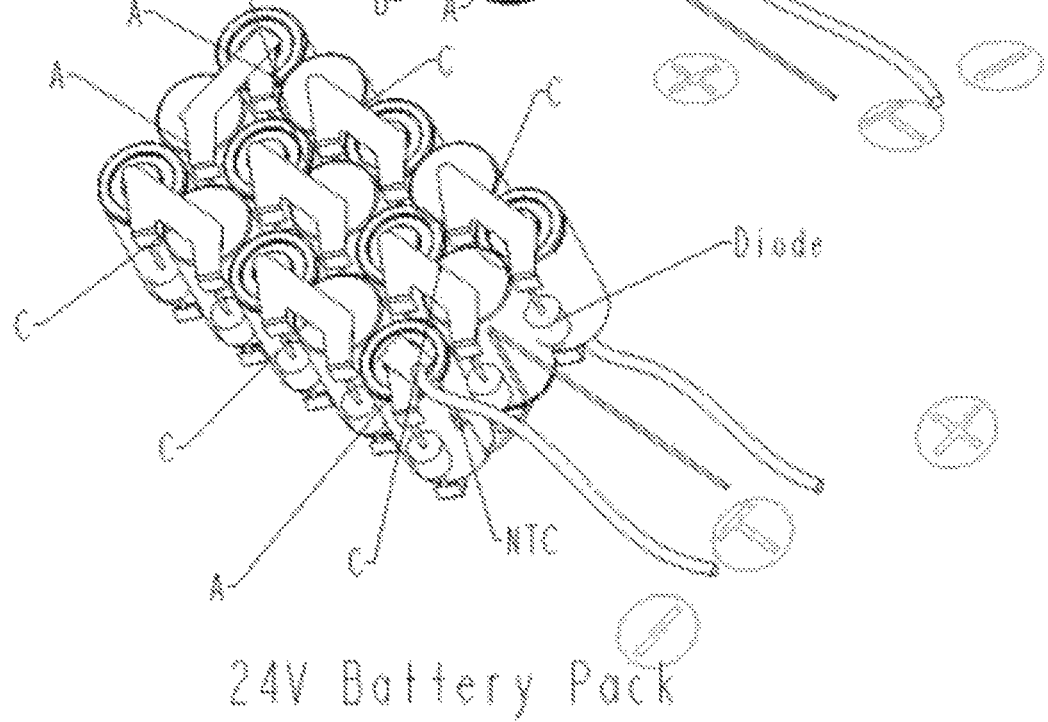

FIGS. 29 and 30 illustrated perspective views of the structure of the 24-volt battery pack formed of 15 battery units. It comprises three rows of resistance sets. Each row has five battery units. Of course, the battery unit mentioned here is preferably nickel-zinc battery. The 15 battery units are connected through the above connecting unit A, B, and C. Referring to FIG. 29, two first connecting units A and six second connecting units B are illustrated. FIG. 30 illustrated that the connection mode of five battery units with three first connecting units A and six third connecting units C may apply the connection mode illustrated in FIG. 20, where two first connecting units A are connected between rows depending on the needs.

The above battery packs according to the present invention can be utilized in various electrical tools, which are preferably different handhold electrical tools, comprising electric saw, electric impact wrench, electric drill, and etc. Correspondingly, these electrical tools usually have battery mounting cavity and the above battery pack according to the present invention can be mounted in the above battery mounting cavity, so as to supply power for the electrical tool to function normally.

Referring to FIG. 6B, the present invention also further provides a manufacturing method for a connecting device of a nickel-zinc battery set, comprising the following steps:

A) respectively electrically connecting the positive terminal 132 and the negative terminal 131 of a first diode 13 to the first positive connecting portion 1214 of a first connecting unit 121 and the second negative connecting portion 1223 of a second connecting unit 122 that is subsequent to the first connecting unit 121, wherein the first cathode connecting portion 1212 of the first connecting unit 121 and the second anode connecting portion 1221 of the second connecting unit 122 form a first position 1201 therebetween;

B) respectively electrically connecting the positive terminal 132 and the negative terminal 131 of another first diode 13 to the second positive connecting portion 1224 of the second connecting unit 122 and the first negative connecting portion 1213 of a first connecting unit 121 that is subsequent to the second connecting unit 122, wherein the second cathode connecting portion 1222 of the second connecting unit 122 and the first anode connecting portion 1211 of the subsequent adjacent first connecting unit 121 form a second position 1202 therebetween; and C) repeating said step A) and B) sequentially for N time, wherein N is a integer not less than zero, so as to obtain the connecting device.

Figure 6A:
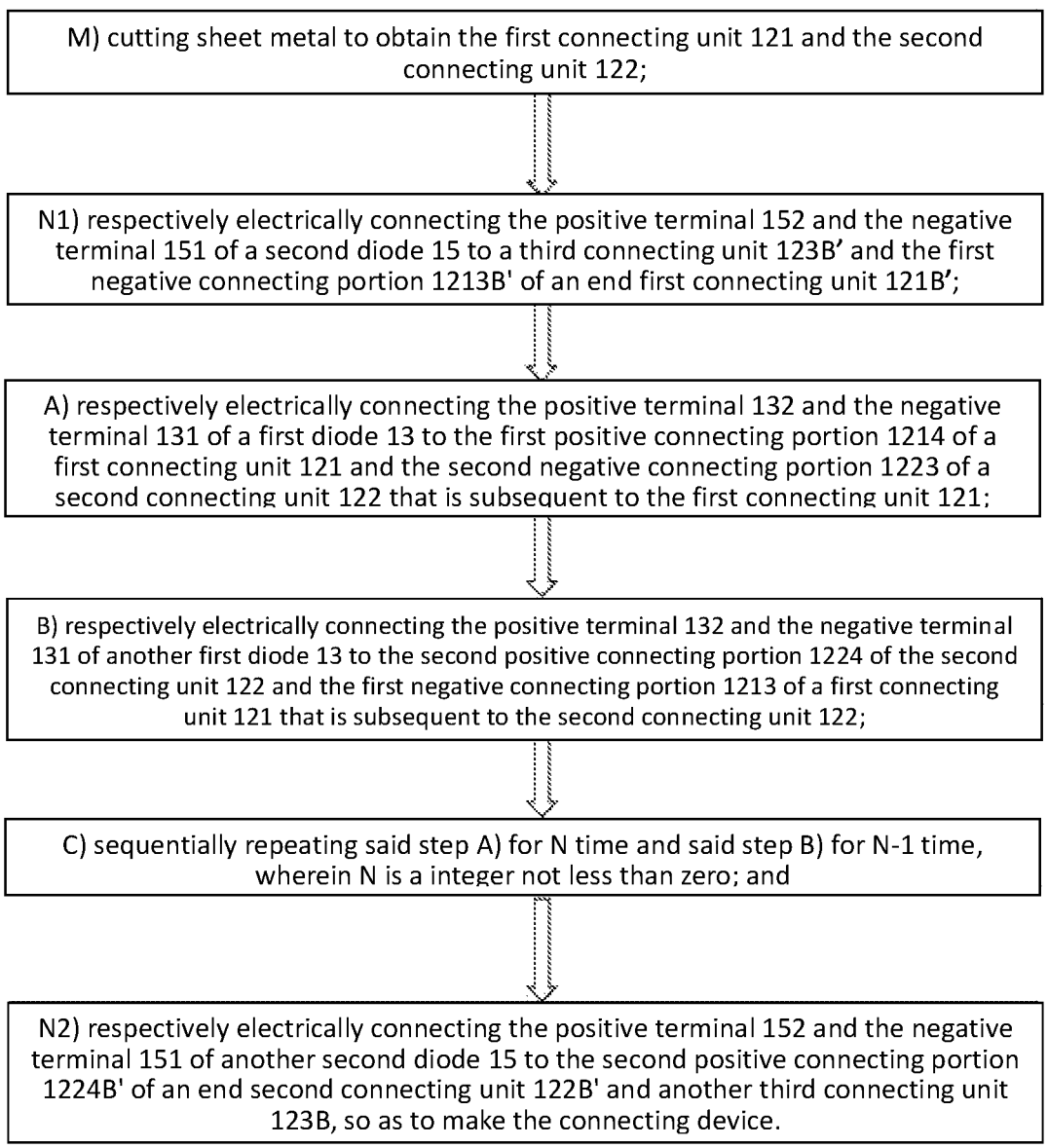
FIG. 6A is a flow diagram of a manufacturing method for the connecting device of a battery set of the nickel-zinc battery system according to the above first preferred embodiment of the present invention.

Alternatively, step C) of the method for to manufacturing the connecting device of a nickel-zinc battery set comprises repeating the step A) and B) sequentially for N time and repeating the step B) for N−1 time, wherein N is a integer not less than zero, as FIG. 6A illustrated.

Referring to FIG. 6B, further, the method for manufacturing connecting device of nickel-zinc battery set according to the present invention comprises the following steps:

M) cutting sheet metal to obtain the first connecting unit 121 and the second connecting unit 122, wherein the first connecting unit 121 comprises a first anode connecting portion 1211, a first cathode connecting portion 1212 extended from the first anode connecting portion 1211, a first negative connecting portion 1212 upward extended from the first anode connecting portion 1211, and a first positive connecting portion 1214 upward extended from the first cathode connecting portion 1212, wherein the second connecting unit 122 comprises a second anode connecting portion 1221, a second cathode connecting portion 1222 extended from the second anode connecting portion 1221, a second negative connecting portion 1223 downward extended from the second anode connecting portion 1221 and a second positive connecting portion 1224 downward extended from the second cathode connecting portion 1222. Preferably, the second connecting unit 122C forms two lateral rims 1220C. The second positive connecting portion 1224C and the second negative connecting portion 1223C of the second connecting unit 122C are respectively downward extended from the same lateral rim 1220C of the second connecting unit 122C. The first connecting unit 121C forms two lateral edges 1210C. The first positive connecting portion 1214C and the first negative connecting portion 1213C of the first connecting unit 121C are respectively upward extended from the same lateral edge 1210C of the first connecting unit 121C. Alternatively, the second connecting unit 122C forms two lateral rims 1220C. The second positive connecting portion 1224C and the second negative connecting portion 1223C of the second connecting unit 122C are respectively downward extended from the two lateral rims 1220C of the second connecting unit 122C. The first connecting unit 121C forms two lateral edges 1210C. The first positive connecting portion 1214C and the first negative connecting portion 1213C of the first connecting unit 121C are respectively upward extended from the two lateral edges 1210C of the first connecting unit 121C.

Referring to FIG. 6B, further, the method for manufacturing connecting device of nickel-zinc battery set according to the present invention comprises the following steps:

N1) respectively electrically connecting the positive terminal 152 and the negative terminal 151 of a second diode 15 to a third connecting unit 123 and the first negative connecting portion 1213' of an end first connecting unit 121', wherein the third connecting unit 123 and the first negative connecting portion 1213' of the first connecting unit 121' form a third connecting position 1205, wherein the second diode 15 is arranged at the third connecting position 1205, wherein the third connecting unit 123 and the end first connecting unit 121' form a third position; and N2) respectively electrically connecting the positive terminal 152 and the negative terminal 151 of a second diode 15 to the first positive connecting portion 1214" of another end first connecting unit 121" and another third connecting unit 123, wherein the first positive connecting portion 1214" of the end first connecting unit 121" and the third connecting unit 123 form another third connecting position 1205, wherein the second diode 15 is arranged at the third connecting position 1205, wherein the step N1) is between the step M) and the step A), wherein the step N2) is after the step C).

Alternatively, the manufacturing method for connecting device of nickel-zinc battery set of the present invention comprises the following steps:

N1) respectively electrically connecting the positive terminal 152 and the negative terminal 151 of a second diode 15 to a third connecting unit 123B' and the first negative connecting portion 1213B' of an end first connecting unit 121B', wherein the third connecting unit 123 and the first negative connecting portion 1213B' of the first connecting unit 121B' form a third connecting position 1205B, wherein the second diode 15 is arranged at the third connecting position 1205B; and N2) respectively electrically connecting the positive terminal 152 and the negative terminal 151 of another second diode 15 to the second positive connecting portion 1224B' of an end second connecting unit 122B' and another third connecting unit 123B, wherein the second positive connecting portion 1224B' of the end second connecting unit 122B' and the third connecting unit 123B form another third connecting position 1205B, wherein the second diode 15 is arranged at the third connecting position 1205B, wherein the step N1) is between the step M) and the step A), wherein the step N2) is after the step C), as FIG. 6A illustrated.

Referring to FIG. 11B, the present invention also further provides a method for manufacturing battery set, comprising the following steps:

A) respectively electrically connecting the positive terminal 132 and the negative terminal 131 of a first diode 13 to the first positive connecting portion 1214 of a first connecting unit 121 and the second negative connecting portion 1223 of a second connecting unit 122 that is subsequent to the first connecting unit 121, wherein the first cathode connecting portion 1212 of the first connecting unit 121 and the second anode connecting portion 1221 of the second connecting unit 122 form a first position 1201 therebetween;

B) respectively electrically connecting the positive terminal 132 and the negative terminal 131 of another first diode 13 to the second positive connecting portion 1224 of the second connecting unit 122 and the first negative connecting portion 1213 of a first connecting unit 121 that is subsequent to the second connecting unit 122, wherein the second cathode connecting portion 1222 of the second connecting unit 122 and the first anode connecting portion 1211 of the subsequent adjacent first connecting unit 121 form a second position 1202 therebetween;

C) repeating said step A) and B) sequentially for N time, wherein N is a integer not less than zero; and D) electrically arranging the first nickel-zinc battery cells 11 at the first position 1201 and the second position respectively 1202, wherein the anode and cathode of the first nickel-zinc battery cell 11 arranged at the first position 1201 are respectively electrically connected to the second connecting unit 122 and the first connecting unit 121, wherein the anode and cathode of the first nickel-zinc battery cell 11 arranged at the second position 1202 are respectively electrically connected to the first connecting unit 121 and the second connecting unit 122, wherein the first nickel-zinc battery cell 11 arranged at the first position 1201 forms a first receiving slot 1101 capable of accommodating the first diode 13, wherein the first nickel-zinc battery cell 11 arranged at the second position 1202 forms a second receiving slot 1102 capable of accommodating the first diode 13.

Figure 11A:
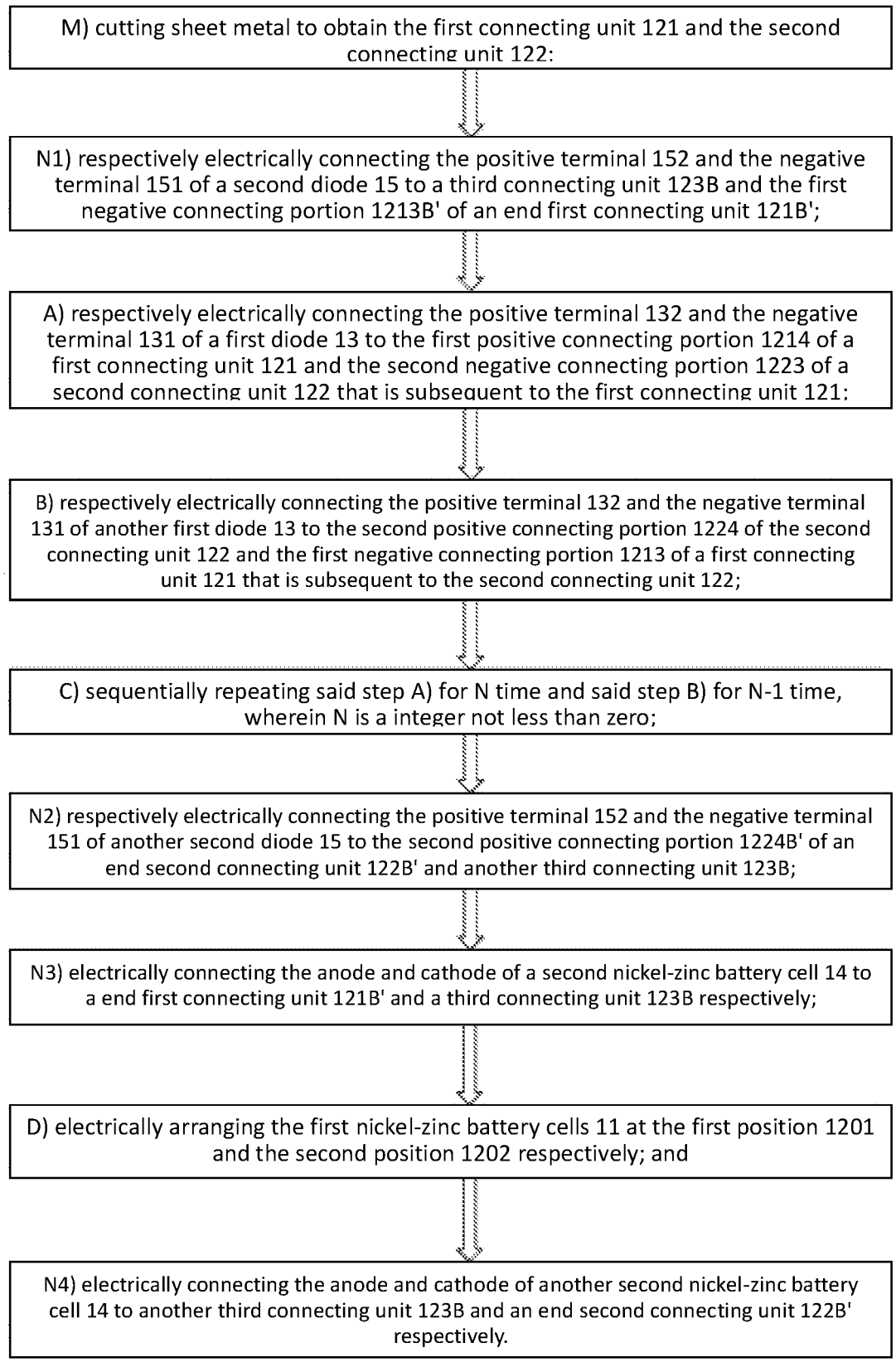
FIG. 11A is a flow diagram of a manufacturing method for a battery set of the nickel-zinc battery system according to the above second preferred embodiment the present invention.

Alternatively, step C) of the method for manufacturing battery set comprises repeating the step A) and B) sequentially for N time and repeating the step B) for N−1 time, wherein N is a integer not less than zero, as FIG. 11A illustrated.

Referring to FIG. 11B, further, the method for manufacturing battery set according to the present invention comprises the following steps:

M) cutting sheet metal to obtain the first connecting unit 121 and the second connecting unit 122, wherein the first connecting unit 121 comprises a first anode connecting portion 1211, a first cathode connecting portion 1212 extended from the first anode connecting portion 1211, a first negative connecting portion 1212 upward extended from the first anode connecting portion 1211, and a first positive connecting portion 1214 upward extended from the first cathode connecting portion 1212, wherein the second connecting unit 122 comprises a second anode connecting portion 1221, a second cathode connecting portion 1222 extended from the second anode connecting portion 1221, a second negative connecting portion 1223 downward extended from the second anode connecting portion 1221 and a second positive connecting portion 1224 downward extended from the second cathode connecting portion 1222. Preferably, the second connecting unit 122C forms two lateral rims 1220C. The second positive connecting portion 1224C and the second negative connecting portion 1223C of the second connecting unit 122C are respectively downward extended from the same lateral rim 1220C of the second connecting unit 122C. The first connecting unit 121C forms two lateral edges 1210C. The first positive connecting portion 1214C and the first negative connecting portion 1213C of the first connecting unit 121C are respectively upward extended from the same lateral edge 1210C of the first connecting unit 121C. Alternatively, the second connecting unit 122C forms two lateral rims 1220C. The second positive connecting portion 1224C and the second negative connecting portion 1223C of the second connecting unit 122C are respectively downward extended from the two lateral rims 1220C of the second connecting unit 122C. The first connecting unit 121C forms two lateral edges 1210C. The first positive connecting portion 1214C and the first negative connecting portion 1213C of the first connecting unit 121C are respectively upward extended from the two lateral edges 1210C of the first connecting unit 121C.

Referring to FIG. 11B, further, the method for manufacturing battery set according to the present invention comprises the following steps:

N1) respectively electrically connecting the positive terminal 152 and the negative terminal 151 of a second diode 15 to a third connecting unit 123 and the first negative connecting portion 1213' of an end first connecting unit 121', wherein the third connecting unit 123 and the first negative connecting portion 1213' of the end first connecting unit 121' form a third connecting position 1205, wherein the second diode 15 is arranged at the third connecting position 1205; and N2) respectively electrically connecting the positive terminal 152 and the negative terminal 151 of a second diode 15 to the first positive connecting portion 1214" of another end first connecting unit 121" and another third connecting unit 123, wherein the first positive connecting portion 1214" of the end first connecting unit 121" and the third connecting unit 123 form another third connecting position 1205, wherein the second diode 15 is arranged at the third connecting position 1205;

N3) electrically connecting the anode and cathode of a second nickel-zinc battery cell 14 to a end first connecting unit 121' and a third connecting unit 123 respectively; and N4) electrically connecting the anode and cathode of another second nickel-zinc battery cell 14 to another third connecting unit 123 and another end first connecting unit 121" respectively, wherein the step N1) is between the step M) and the step A), wherein the step N2) is after the step C), wherein the step N3) is between the step C and the step D), wherein the step N4) is after the step D).

Alternatively, the manufacturing method for battery set of the present invention further comprises the following steps:

N1) respectively electrically connecting the positive terminal 152 and the negative terminal 151 of a second diode 15 to a third connecting unit 123B and the first negative connecting portion 1213B' of an end first connecting unit 121B', wherein the third connecting unit 123B and the first negative connecting portion 1213B' of the end first connecting unit 121B' form a third connecting position 1205B, wherein the second diode 15 is arranged at the third connecting position 1205B;

N2) respectively electrically connecting the positive terminal 152 and the negative terminal 151 of another second diode 15 to the second positive connecting portion 1224B' of an end second connecting unit 122B' and another third connecting unit 123B, wherein the second positive connecting portion 1224B' of the end second connecting unit 122B' and the third connecting unit 123B form another third connecting position 1205B, wherein the second diode 15 is arranged at the third connecting position 1205B;

N3) electrically connecting the anode and cathode of a second nickel-zinc battery cell 14 to a end first connecting unit 121B' and a third connecting unit 123B respectively; and N4) electrically connecting the anode and cathode of another second nickel-zinc battery cell 14 to another third connecting unit 123B and an end second connecting unit 122B' respectively, wherein the step N1) is between the step M) and the step A), wherein the step N2) is after the step C), wherein the step N3) is between the step C and the step D), wherein the step N4) is after the step D), as FIG. 11A illustrated.

It should be noted that, preferably, the anode of the first nickel-zinc battery cell 11 of the battery set arranged at the first position 1201 can be electrically welded and soldered to the second anode connecting portion 1221 of the second connecting unit 122 through spot welding, while the cathode thereof can be electrically welded and soldered to the first cathode connecting portion 1212 of the previous adjacent first connecting unit 121 through spot welding. Also, the anode of the first nickel-zinc battery cell 11 of the battery set 10 arranged at the second position 1202 can be electrically welded and soldered to the first anode connecting portion 1211 of the subsequent adjacent first connecting unit 121 through spot welding, while the cathode thereof can be electrically welded and soldered to the second cathode connecting portion 1222 of the second connecting unit 122 through spot welding. Besides, the negative terminal 131 of the first diode 13 arranged at the first connecting position 1203 is electrically welded on the second negative connecting portion 1223 of the second connecting unit 122 through spot welding, while the positive terminal 132 is electrically welded on the first positive connecting portion 1214 of the first connecting unit 121 adjacent to the second connecting unit 122 through spot welding. The positive terminal 132 of the first diode 13 arranged at the second connecting position 1204 is electrically welded on the second positive connecting portion 1224 of the second connecting unit 122 through spot welding. The negative terminal 131 is electrically welded on the first negative connecting portion 1213 of the first connecting unit 121 subsequently adjacent to the second connecting unit 122 through spot welding. In other words, the second anode connecting portion 1221 of the second connecting unit 122 is electrically welded and soldered to the anode of a nickel-zinc battery cell through spot welding. The second cathode connecting portion 1222 of the second connecting unit 122 is electrically welded and soldered to the cathode of another nickel-zinc battery cell through spot welding. Similarly, the first anode connecting portion 1211 of the first connecting unit 121 is electrically welded and soldered to the anode of a nickel-zinc battery cell through spot welding. The first cathode connecting portion 1212 of the first connecting unit 121 is electrically welded and soldered to the cathode of another nickel-zinc battery cell through spot welding.

Those skilled in the art will understand that the above-mentioned embodiments of the present invention in the descriptions and figures are to give examples, but to confine the present invention.

It can accordingly be seen that objectives of the present invention can be completely and effectively implemented. The embodiments for illustrating notions of the functions and structures of the present invention have been fully described and illustrated, while the present invention shall not be limited by the changings based on these notions of the embodiments. Therefore, the present invention covers all modifications and changes in any ways without going against the spirit and the claimed scope of the present invention.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A nickel-zinc battery system, comprising:
at least a battery set; and
a battery case accommodating said battery set therewithin, wherein each said battery set has a positive pole and a negative pole, wherein said battery case comprises a casing, an anode interface arranged on said casing, and a cathode interface arranged on said casing, wherein said anode interface of said battery case and said positive pole of said battery set are electrically connected, wherein said cathode interface of said battery case and said negative pole of said battery set are electrically connected, wherein said battery set comprises:
a plurality of first nickel-zinc battery cell;
a connecting device connecting said first cell nickel-zinc batteries of said battery set in series; and
a plurality of first diodes, wherein said first diodes of said battery set respectively correspond to said first nickel-zinc battery cells of said battery set, wherein said connecting device comprises at least a first connecting unit and at least a second connecting unit, wherein said first connecting unit and said second connecting unit are both made of conductive material and said first connecting unit and said second connecting unit of said connecting device are alternately arranged, so as to allow each said second connecting unit to form a first position with the previous adjacent said first connecting unit, a first connecting position subsequent to said first position, a second position with the subsequent adjacent said first connecting unit, and a second connecting position next to said second position, wherein said nickel-zinc battery cells of said battery set are respectively arranged at said first position and said second position, wherein said first nickel-zinc battery cells of said battery set are arranged to be connected in series through said first connecting unit and said second connecting unit, wherein said first diodes of said battery set are respectively arranged at said first connecting position and said second connecting position, wherein a negative terminal of each said first diode is electrically connected with the anode of corresponding said first nickel-zinc battery cell through said first connecting unit and said second connecting unit, wherein a positive terminal of said first diode is electrically connected with the cathode of said first nickel-zinc battery cell through said first connecting unit and said second connecting unit, such that said first diodes are connected with said first nickel-zinc battery cells respectively and are electrically connected with said first nickel-zinc battery cells in series, wherein said first nickel-zinc battery cell arranged at said first position forms a first receiving slot, wherein said first nickel-zinc battery cell arranged at said second position forms a second receiving slot, wherein said first connecting position is formed within said first receiving slot, wherein said second connecting position is formed within said second receiving slot, wherein said first diodes are arranged in said first and second receiving slots respectively.

2. The nickel-zinc battery system, as recited in claim 1, wherein said connecting device comprises at least two said first connecting unit and at least one said second connecting unit, wherein each said second connecting unit is arranged between two adjacent first connecting units respectively, such that said connecting device forms two end first connecting units, wherein one of said end first connecting unit of said two end first connecting units of said connecting device forms said positive pole of said battery set, while the other said end first connecting unit forms said negative pole of said battery set.

3. The nickel-zinc battery system, as recited in claim 2, wherein each said first connecting unit of said connecting device comprises a first anode connecting portion, a first cathode connecting portion extended from said first anode connecting portion, a first negative connecting portion upward extended from said first anode connecting portion, and a first positive connecting portion upward extended from said first cathode connecting portion, wherein each said second connecting unit comprises a second anode connecting portion, a second cathode connecting portion extended from said second anode connecting portion, a second negative connecting portion downward extended from said second anode connecting portion, and a second positive connecting portion downward extended from said second cathode connecting portion, wherein said second anode connecting portion of each said second connecting unit and said first cathode connecting portion of the previous adjacent said first connecting unit form said first position, wherein said second cathode connecting portion of said second connecting unit and said first anode connecting portion of the subsequent adjacent said first connecting unit form said second position, wherein said second negative connecting portion of said second connecting unit and said first positive connecting portion of the previous adjacent said first connecting unit form said first connecting position therebetween, wherein said second positive connecting portion of said second connecting unit and said first negative connecting portion of the subsequent adjacent said first connecting unit form said second connecting position therebetween.

4. The nickel-zinc battery system, as recited in claim 1, wherein said battery set further comprises two second nickel-zinc battery cells and two second diodes, wherein said second diodes respectively correspond to said second nickel-zinc battery cells, wherein said connecting device further comprises at least two first connecting units, at least a second connecting unit, and two third connecting units, wherein each said second connecting unit is respectively arranged between two adjacent first connecting units, such that said connecting device form two end first connecting units, wherein second nickel-zinc battery cells of said battery set are respectively arranged on said two end first connecting units of said connecting device, wherein said second nickel-zinc battery cells are arranged to be connected with said first nickel-zinc battery cells of said battery set in series through said two end first connecting units of said connecting device, wherein said third connecting units of said connecting device are respectively arranged on said second nickel-zinc battery cells of said battery set, wherein said third connecting units are arranged to form said positive pole and said negative pole of said battery set respectively.

5. The nickel-zinc battery system, as recited in claim 1, wherein said connecting device forms an end first connecting unit and an end second connecting unit, wherein said end first connecting unit of said connecting device forms said negative pole of said battery set, wherein said end second connecting unit forms said positive pole of said battery set.

6. The nickel-zinc battery system, as recited in claim 5, wherein said second negative connecting portion of said second connecting unit and said first positive connecting portion of said first connecting unit of said connecting device are respectively arranged in said first receiving slot formed by said first nickel-zinc battery cell of said battery set, wherein said first negative connecting portion of said first connecting unit and said second positive connecting portion of said second connecting unit are respectively arranged in said second receiving slot formed by said first nickel-zinc battery cell of said battery set.

7. The nickel-zinc battery system, as recited in claim 6, wherein each said second connecting unit of said connecting device has two lateral rims formed thereon, wherein said second negative connecting portion and said second positive connecting portion of said second connecting unit of said connecting device are respectively arranged on said second anode connecting portion and said second cathode connecting portion, wherein said second positive connecting portion and said second negative connecting portion are respectively downward extended from the same said lateral rim of said second connecting unit, wherein each said first connecting unit of said connecting device has two lateral edges formed thereon, wherein said first positive connecting portion and said first negative connecting portion of said first connecting unit of said connecting device are respectively arranged on said first cathode connecting portion and said first anode connecting portion, wherein said first positive connecting portion and said first cathode connecting portion are respectively upward extended from the same said lateral edge of said first connecting unit, such that said first connecting position and said second connecting position formed by said second connecting unit and said first connecting unit of said connecting device are respectively arranged on the same said lateral side of said battery set.

8. The nickel-zinc battery system, as recited in claim 6, wherein each said second connecting unit of said connecting device has two lateral rims formed thereon, wherein said second negative connecting portion and said second positive connecting portion of said second connecting unit of said connecting device are respectively arranged on said second anode connecting portion and said second cathode connecting portion, wherein said second positive connecting portion and said second negative connecting portion are respectively downward extended from two said lateral rims of said second connecting unit, wherein each said first connecting unit of said connecting device has two lateral edges formed thereon, wherein said first positive connecting portion and said first negative connecting portion of said first connecting unit of said connecting device are respectively arranged on said first cathode connecting portion and said first anode connecting portion, wherein said first positive connecting portion and said first cathode connecting portion are respectively upward extended from two said lateral edges of said first connecting unit, such that said first connecting position and said second connecting position formed by said second connecting unit and said first connecting unit of said connecting device are respectively arranged on two said lateral sides of said battery set.

9. The nickel-zinc battery system, as recited in claim 1, wherein said battery set further comprises two second nickel-zinc battery cells and two second diodes, wherein said second diodes respectively correspond to said second nickel-zinc battery cells, wherein said connecting device further comprises two third connecting units, wherein said connecting device has two end first connecting units and two end second connecting units formed thereon, wherein said second nickel-zinc battery cells of said battery set are respectively arranged on said end first connecting units and said end second connecting units of said connecting device, wherein said second nickel-zinc battery cells are arranged to be connected with said first nickel-zinc battery cells of said battery set in series through said end first connecting units and said end second connecting units of said connecting device, wherein said third connecting units of said connecting device are respectively arranged on said second nickel-zinc battery cells of said battery set, wherein said third connecting units are arranged to form said positive pole and said negative pole of said battery set respectively, wherein each said first connecting unit of said connecting device comprises a first anode connecting portion, a first cathode connecting portion extended from said first anode connecting portion, a first negative connecting portion upward extended from said first anode connecting portion, and a first positive connecting portion upward extended from said first cathode connecting portion, wherein each said second connecting unit comprises a second anode connecting portion, a second cathode connecting portion extended from said second anode connecting portion, a second negative connecting portion downward extended from said second anode connecting portion, and a second positive connecting portion downward extended from said second cathode connecting portion, wherein said second anode connecting portion of each said second connecting unit and said first cathode connecting portion of the previous adjacent said first connecting unit form said first position, wherein said second cathode connecting portion of said second connecting unit and said first anode connecting portion of the subsequent adjacent said first connecting unit form said second position, wherein said second negative connecting portion of said second connecting unit and said first positive connecting portion of the previous adjacent said first connecting unit form said first connecting position therebetween, wherein said second positive connecting portion of said second connecting unit and said first negative connecting portion of the subsequent adjacent said first connecting unit form said second connecting position therebetween.

10. A connecting device for connecting a plurality of nickel-zinc battery cells in series, which forms a first receiving slot when said nickel-zinc battery cells are arranged at a first position, and a second receiving slot when said nickel-zinc battery cells are arranged at a second position, wherein said connecting device comprises:

at least a first connecting unit;

at least a second connecting unit, wherein said first connecting unit and said second connecting unit are both made of conductive material and said first connecting unit and said second connecting unit of said connecting device are alternately arranged, so as to allow each said second connecting unit to form said first position with the previous adjacent said first connecting unit, a first connecting position subsequent to said first position, said second position with the subsequent adjacent said first connecting unit, and a second connecting position next to said second position, wherein said nickel-zinc battery cells are respectively arranged at said first position and said second position, so as to allow said nickel-zinc battery cell to be connected in series through said first connecting unit and said second connecting unit, wherein said first connecting position is arranged within said first receiving slot, wherein said second connecting position is arranged within said second receiving slot; and a plurality of diodes arranged in said first and second receiving slots respectively, wherein each of said diodes has a negative terminal arranged for electrically connecting with an anode of the nickel-zinc battery cell through said first connecting unit and said second connecting unit and a positive terminal arranged for electrically connecting with a cathode of the nickel-zinc battery cell through said first connecting unit and said second connecting unit, such that said first diodes are arranged for being connected with the nickel-zinc battery cells respectively and are arranged for being electrically connected with the nickel-zinc battery cells in series.

11. The connecting device, as recited in claim 10, comprising at least two said first connecting unit and at least one said second connecting unit, wherein each said second connecting unit is arranged between two adjacent first connecting units respectively, such that said connecting device forms two end first connecting units.

12. The connecting device, as recited in claim 10, comprising at least two first connecting units, at least a second connecting unit, and two third connecting units, wherein each said second connecting unit is respectively arranged between two adjacent said first connecting unit, so as for said connecting device to form two end first connecting units, wherein said third connecting units are respectively form two third positions and two third connecting positions with said two end first connecting units of said connecting device, wherein said third connecting positions are arranged to respectively adjacent to said third positions, wherein said nickel-zinc battery cell arranged at said third position is connected in series with said nickel-zinc battery cells arranged at said first position and said second position through said two end first connecting units of said connecting device, wherein said nickel-zinc battery cell arranged at said third position forms a third receiving slot, wherein said third connecting position is arranged at said third receiving slot.

13. The connecting device, as recited in claim 10, forming an end first connecting unit and an end second connecting unit.

14. The connecting device, as recited in claim 10, further comprising two third connecting units, wherein said connecting device forms an end first connecting unit and an end second connecting unit, wherein said third connecting units are respectively form two third positions and two third connecting positions with said end first connecting unit and said end second connecting unit of said connecting device, wherein said third connecting positions are arranged to respectively adjacent to said third positions, wherein said nickel-zinc battery cell arranged at said third position is connected in series with said nickel-zinc battery cells arranged at said first position and said second position through said end first connecting units and said end second connecting unit of said connecting device, wherein said nickel-zinc battery cell arranged at said third position forms a third receiving slot, wherein said third connecting position is arranged at said third receiving slot.

15. The connecting device, as recited in claim 10, wherein each said first connecting unit comprises a first anode connecting portion, a first cathode connecting portion extended from said first anode connecting portion, a first negative connecting portion upward extended from said first anode connecting portion, and a first positive connecting portion upward extended from said first cathode connecting portion, wherein each said second connecting unit comprises a second anode connecting portion, a second cathode connecting portion extended from said second anode connecting portion, a second negative connecting portion downward extended from said second anode connecting portion, and a second positive connecting portion downward extended from said second cathode connecting portion, wherein said second anode connecting portion, each said second connecting unit and said first cathode connecting portion of the previous adjacent said first connecting unit form said first position, wherein said second cathode connecting portion of said second connecting unit and said first anode connecting portion of the subsequent adjacent said first connecting unit form said second position, wherein said second negative connecting portion of said second connecting unit and said first positive connecting portion of the previous adjacent said first connecting unit form said first connecting position therebetween, wherein said second positive connecting portion of said second connecting unit and said first negative connecting portion of the subsequent adjacent said first connecting unit form said second connecting position therebetween.

16. The connecting device, as recited in claim 15 wherein said second negative connecting portion of said second connecting unit and said first positive connecting portion of said first connecting unit are respectively arranged in said first receiving slot formed by said nickel-zinc battery cell, wherein said first negative connecting portion of said first connecting unit and said second positive connecting portion of said second connecting unit are respectively arranged in said second receiving slot formed by said nickel-zinc battery cell.

17. The connecting device, as recited in claim 16, wherein each said second connecting unit has two lateral rims formed thereon, wherein said second negative connecting portion and said second positive connecting portion of said second connecting unit are respectively arranged on said second anode connecting portion and said second cathode connecting portion, wherein said second positive connecting portion and said second negative connecting portion are respectively downward extended from the same said lateral rim of said second connecting unit, wherein each said first connecting unit has two lateral edges formed thereon, wherein said first positive connecting portion and said first negative connecting portion of each said first connecting unit are respectively arranged on said first cathode connecting portion and said first anode connecting portion, wherein said first positive connecting portion and said first cathode connecting portion are respectively upward extended from the same said lateral edge of said first connecting unit, such that said first connecting position and said second connecting position formed by said second connecting unit and said first connecting unit are respectively arranged on the same side of said connecting device.

18. A manufacturing method for connecting device of nickel-zinc battery set which comprises a plurality of nickel-zinc battery cells, comprising the following steps:
(A) respectively electrically connecting a positive terminal and a negative terminal of a first diode to the first positive connecting portion of a first connecting unit and the second negative connecting portion of a second connecting unit that is subsequent to the first connecting unit, wherein the first cathode connecting portion of the first connecting unit and the second anode connecting portion of the second connecting unit form a first position therebetween;
(B) respectively electrically connecting a positive terminal and a negative terminal of another first diode to the second positive connecting portion of a second connecting unit and the first negative connecting portion of a first connecting unit that is subsequent to the second connecting unit, wherein the second cathode connecting portion of the second connecting unit and the first anode connecting portion of the first connecting unit form a second position therebetween; and
(C) repeating the step (A) and the step (B) sequentially for N time and repeating the step (B) for N−1 time, wherein N is a integer not less than zero, so as to obtain the connecting device, wherein said nickel-zinc battery cells are respectively arranged at said first position and said second position and are arranged to be connected in series through said first connecting unit and said second connecting unit, such that said first diodes are connected with said nickel-zinc battery cells respectively and are electrically connected with said nickel-zinc battery cells in series.

19. The method, as recited in claim 18, further comprising a step of: (M) cutting sheet metal to obtain the first connecting unit and the second connecting unit, wherein the first connecting unit comprises a first anode connecting portion, a first cathode connecting portion extended from the first anode connecting portion, a first negative connecting portion upward extended from the first anode connecting portion, and a first positive connecting portion upward extended from the first cathode connecting portion, wherein the second connecting unit comprises a second anode connecting portion, a second cathode connecting portion extended from the second anode connecting portion, a second negative connecting portion downward extended from the second anode connecting portion, and a second positive connecting portion downward extended from the second cathode connecting portion, wherein the step (M) is before the step (A).

20. The method, as recited in claim 19, further comprising a step of: (N1) respectively electrically connecting the positive terminal and the negative terminal of a second diode to a third connecting unit and the first negative connecting portion of an end first connecting unit, wherein the third connecting unit and the first negative connecting portion of the first connecting unit form a third connecting position, wherein the second diode is arranged at the third connecting position; and (N2) respectively electrically connecting the positive terminal and the negative terminal of another second diode to the second positive connecting portion of an end second connecting unit and another third connecting unit, wherein the second positive connecting portion of the end second connecting unit and the third connecting unit form another third connecting position, wherein the second diode is arranged at the third connecting position, wherein the step (N1) is between the step (M) and the step (A), wherein the step (N2) is after the step (C).

* * * * *